(12) United States Patent　　(10) Patent No.: US 10,380,616 B2
Parker　　(45) Date of Patent: Aug. 13, 2019

(54) SYSTEM AND METHOD FOR ECONOMIC ANALYTICS AND BUSINESS OUTREACH, INCLUDING LAYOFF AVERSION

(71) Applicant: Cheryl Parker, San Francisco, CA (US)

(72) Inventor: Cheryl Parker, San Francisco, CA (US)

( * ) Notice: Subject to any disclaimer, the term of this patent is extended or adjusted under 35 U.S.C. 154(b) by 545 days.

(21) Appl. No.: 15/067,362

(22) Filed: Mar. 11, 2016

(65) Prior Publication Data

US 2016/0364740 A1　　Dec. 15, 2016

Related U.S. Application Data

(60) Provisional application No. 62/173,666, filed on Jun. 10, 2015.

(51) Int. Cl.
　　*G06Q 30/02*　　(2012.01)
　　*G06Q 10/10*　　(2012.01)
　　*G06T 11/20*　　(2006.01)

(52) U.S. Cl.
　　CPC ....... *G06Q 30/0205* (2013.01); *G06Q 10/105* (2013.01); *G06T 11/206* (2013.01); *G06T 2200/24* (2013.01)

(58) Field of Classification Search
　　CPC .......................................... G06Q 10/00–50/00
　　USPC ................................................ 705/7.11–7.42
　　See application file for complete search history.

(56) References Cited

U.S. PATENT DOCUMENTS

| 7,925,982 | B2 * | 4/2011 | Parker | G06F 17/30241 |
| | | | | 370/310 |
| 8,175,945 | B2 * | 5/2012 | Haggerty | G06Q 30/0201 |
| | | | | 705/35 |
| 8,176,440 | B2 * | 5/2012 | Stading | G06F 17/30554 |
| | | | | 715/853 |
| 8,745,086 | B2 * | 6/2014 | Cardno | G06F 17/30572 |
| | | | | 707/778 |

(Continued)

OTHER PUBLICATIONS

Weber, Patrick, and Dave Chapman. "Investing in geography: A GIS to support inward investment." Computers, Environment and Urban Systems 33.1 (2009): 1-14. (Year: 2009).*

(Continued)

*Primary Examiner* — Alan S Miller
(74) *Attorney, Agent, or Firm* — Steven H. Meyer, Esq.

(57) ABSTRACT

A computing system supports economic analytics and business outreach, including layoff aversion. The system includes a current and historical business Geographical Information System (GIS) with a database of a region and labor market web-services, a regional economy visual and spatial analytics interactive data visualization (IDV) Graphical User Interface (GUI), and a map-based customer relations management (CRM) GUI for local employer outreach map-based CRM. The IDV GUI and CRM GUI are employed to compile a list of employers of interest, and to apply a financial stress filter to the list of employers. The financial stress filter refers to an external database for a financial stress score for each employer in the list and based thereon determines which employers in the list are in danger of layoffs. Each employer in danger of layoffs is stored in a record in the GIS, and may be the subject of a layoff aversion outreach campaign.

12 Claims, 22 Drawing Sheets

(56) References Cited

U.S. PATENT DOCUMENTS

| | | | | |
|---|---|---|---|---|
| 8,793,610 B2* | 7/2014 | Parker | G06F 3/0488 | 715/780 |
| 8,799,812 B2* | 8/2014 | Parker | G06F 17/30241 | 715/790 |
| 8,918,730 B2* | 12/2014 | von Kaenel | G06Q 40/08 | 715/764 |
| 9,390,399 B2* | 7/2016 | Parker | G06Q 10/10 | |
| 2002/0055924 A1* | 5/2002 | Liming | G01S 5/0027 | |
| 2002/0116282 A1* | 8/2002 | Martin | G06Q 20/202 | 705/37 |
| 2002/0198760 A1* | 12/2002 | Carpenter | G06Q 30/02 | 705/7.34 |
| 2003/0149571 A1* | 8/2003 | Francesco | G06Q 10/063 | 705/7.11 |
| 2004/0117358 A1* | 6/2004 | von Kaenel | G06F 17/30241 | |
| 2005/0071217 A1* | 3/2005 | Hoogs | G06Q 10/0635 | 705/7.28 |
| 2007/0011183 A1* | 1/2007 | Langseth | G06F 17/30616 | |
| 2007/0067206 A1* | 3/2007 | Haggerty | G06Q 30/0201 | 705/7.34 |
| 2008/0059889 A1* | 3/2008 | Parker | G06F 17/30241 | 715/748 |
| 2008/0231630 A1* | 9/2008 | Shenkar | G06F 17/30241 | 345/419 |
| 2008/0243787 A1* | 10/2008 | Stading | G06F 17/30864 | |
| 2008/0275765 A1* | 11/2008 | Kuchar | G06Q 10/06 | 705/7.42 |
| 2009/0322754 A1* | 12/2009 | Robertson | G06T 11/20 | 345/440 |
| 2011/0261049 A1* | 10/2011 | Cardno | G06Q 10/10 | 345/419 |
| 2011/0270705 A1* | 11/2011 | Parker | G06F 17/30241 | 705/26.61 |
| 2012/0053986 A1* | 3/2012 | Cardno | G06F 17/30572 | 705/7.29 |
| 2012/0278752 A1* | 11/2012 | Parker | G06F 3/0488 | 715/780 |
| 2013/0013589 A1* | 1/2013 | Stevenson | G06Q 30/02 | 707/722 |
| 2013/0060603 A1* | 3/2013 | Wagner | G06Q 30/0202 | 705/7.29 |
| 2014/0046983 A1* | 2/2014 | Galloway | G06F 17/30958 | 707/798 |
| 2015/0186910 A1* | 7/2015 | Cruickshank | G06F 17/30241 | 705/7.34 |
| 2016/0171425 A1* | 6/2016 | Sanger | G06Q 10/063118 | 705/7.17 |
| 2017/0097963 A1* | 4/2017 | Galloway | G06Q 30/0201 | |

OTHER PUBLICATIONS

DiBiase, David, et al. "The new geospatial technology competency model: Bringing workforce needs into focus." Urisa Journal 22.2 (2010): 55. (Year: 2010).*

Câmara, Gilberto, et al. "TerraLib: An open source GIS library for large-scale environmental and socio-economic applications." Open source approaches in spatial data handling. Springer, Berlin, Heidelberg, 2008. 247-270. (Year: 2008).*

* cited by examiner

FIG. 2
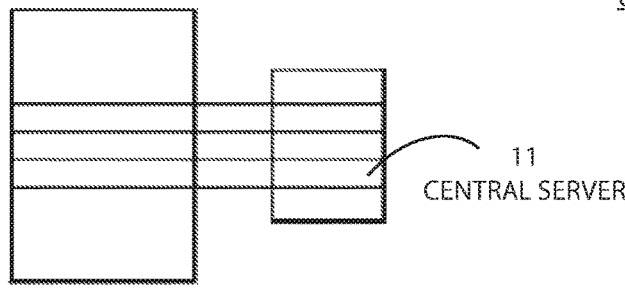
600
11 CENTRAL SERVER
12 CLIENT-SIDE SCRIPTS SEND REQUESTS TO RETRIEVE MAPPED INFORMATION AND DATASETS FROM THE CENTRAL SERVER VIA A HIGH-SPEED INTERNET CONNECTION
13 CLIENT WEB BROWSERS
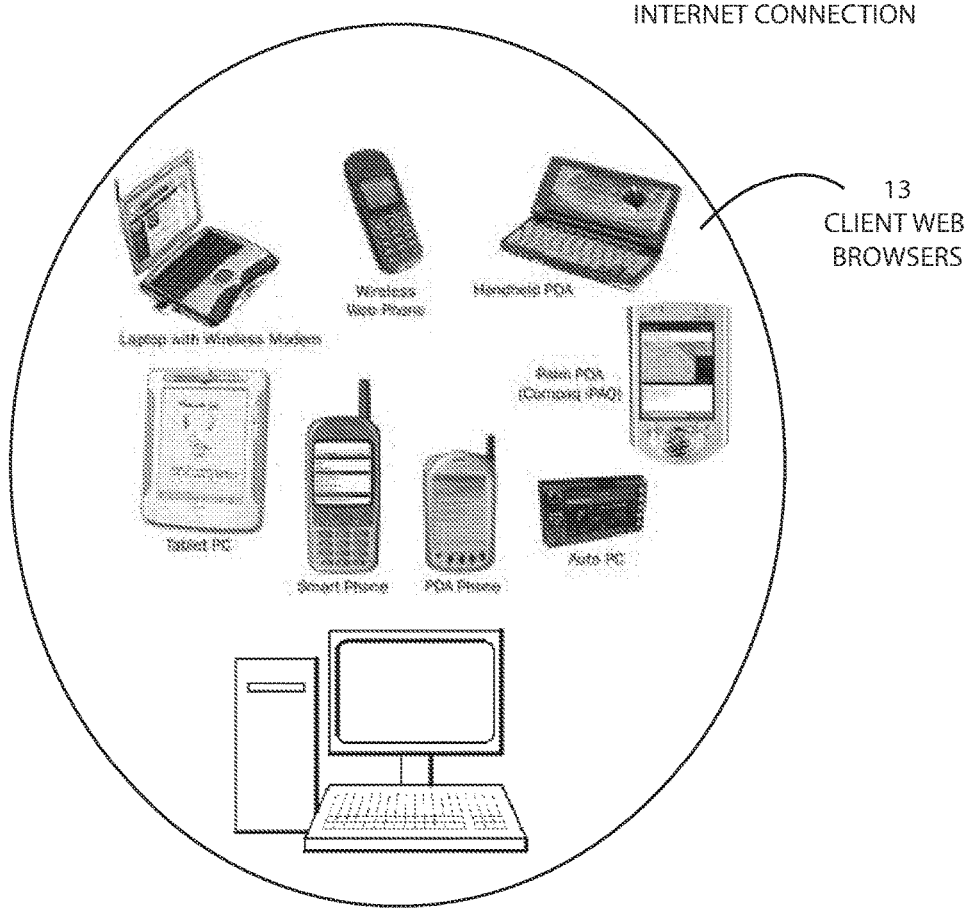

SYSTEM AND METHOD FOR ECONOMIC ANALYTICS AND BUSINESS OUTREACH, INCLUDING LAYOFF AVERSION

CROSS-REFERENCE TO RELATED APPLICATION

The present application claims priority from U.S. Provisional Pat. Application No. 62/173,666, filed on Jun. 10, 2015, which is hereby incorporated by reference in its entirety.

FIELD

The present disclosure relates to performing web-based mapping services and functions. More particularly, the present disclosure relates to performing such mapping services and functions for regional Workforce Development Boards (WDBs). Specifically, the subject matter of the present disclosure is designed to respond to their needs with respect to the Federal Workforce Innovations and Opportunity Act (WIOA) (H.R. 803; Pub.L. 113-128), with regard to the process of outreach involved in layoff aversion. Per this law, WDBs are tasked with (1) identifying regional companies within "priority sectors" which may be on the verge of layoffs (well before a Worker Adjustment and Retraining Notification (WARN) gets issued), (2) reaching out to these companies and offering business assistance to try and prevent layoffs, (3) assisting the employees who may be getting laid-off to find new jobs in local companies and (4) maintaining a record of all outreach efforts and results.

BACKGROUND

The existing process employed by WDBs with respect to the above-mentioned required tasks is cumbersome, time consuming and expensive. Steps in the existing process include:

Determining the priority sectors in a region: WDBs likely use a combination of hiring consultants and subscribing to regional economic analysis software in order to study the regional economy and pinpoint sectors which appear as important to the region. No set formula is used to determine a "priority sector" and thus any number of factors may be used in its determination.

Determining the companies within the priority sectors which may be experiencing layoffs soon: In the best circumstances, WDBs use the Dun & Bradstreet (D&B) Financial Stress Score to determine which businesses to reach out to, targeting those which may just be starting to experience financial difficulties, as indicated by this score. In these cases, the D&B data are either accessed via a "raw" flat-file format or via an on-line search portal which, upon entering criteria, returns results in a list-based or spreadsheet format. Thus, while useful, the list is stand-alone, requiring import into various other software programs in order to map it, connect to contacts, be shared among a group, etc. Even with these limitations, the use of the D&B Financial Stress Score for layoff aversion is considered a best practice among WDBs nationally.

Most of the time, however, agencies do not know which companies are in poor financial shape until a WARN notice gets issued and, by this time, layoffs are imminent. The WIOA specifically states, though, that business assistance outreach efforts must be made prior to the issuing of a WARN notice to try and prevent layoffs if possible. By using the D&B Financial Stress Score, and focusing on companies with a "level 4" score, for example, WDBs can identify those companies which are just starting to experience financial difficulties, but for whom WARN notices may not be issued for another 6 months to a year.

Absent using D&B's Financial Stress Score, which is done by most WDBs, a typical WDB either guesses which companies are in poor financial shape, or tries to canvas all local businesses via email, standard mail or door-knocking campaigns to determine same. Given the lack of good business lists or email contacts, door-knocking is often the default option.

Recording the Outreach Process: Given that funding targeted for layoff aversion is tied directly to the recorded tabulation of outreach efforts, in a document known as a "122 report", WDB personnel spend a good deal of time documenting their efforts. Some of the required pieces of information include: identifying the NAICs code of a company, indicating whether the company is within a priority sector, street address, size of company, as well as notes about the actual outreach. Unfortunately, the WDB staff spends a good deal of time researching the company descriptive information to the detriment of time that could be better spent by doing the actual outreach.

Assisting workers displaced by companies in poor financial shape to find employment in similar companies throughout the region: If a company does, unfortunately, engage in layoffs, a goal of the legislation is to assist those workers in finding comparable jobs in regional companies. Though some extremely good web-based job search engines exist, it is not straightforward to engage in job searches using these interfaces in order to find local companies similar to the one from which the workers are being laid-off.

WDB personnel engage a variety of existing software and databases in trying to achieve the above tasks. Each is stand-alone and requires a substantial investment in time for staff to input data in one, output data to another, and supplement output data with various other data sources, research, etc. These existing components come in a few categories including business databases, data visualization software, and customer relations management (CRM) software.

Business Databases: A few public databases provide data about employers. With regards to public data sources, the Employment Development Department (EDD) Labor Market Information Division (LMID) collects data about businesses that run payroll. One obvious limitation of this source of data is that it is restricted to just those businesses running payroll. As such, small companies will not be recorded in the data. In addition, privacy restrictions require that the data only be provided in an aggregated manner and, furthermore, that only companies with 20 or more employees be included in these aggregated counts.

Given these limitations on public databases, proprietary databases become a viable alternative. These are available in two categories: company databases used for marketing purposes and those used for business credit purposes. In the former category, InfoUSA is a good example, and in the latter category, Dun & Bradstreet, Equifax and Experian are good examples. With regard to the needs of layoff aversion, the credit-based databases provide the best resource, given that they feature information related to a company's financial health and stability. In particular, the Dun & Bradstreet database, with its Financial Stress Score, is a valuable resource. While these proprietary databases provide a wealth of information about the employers in a region, extracting data as a spreadsheet or in a record-by-record format sans tools for visual analysis can, unfortunately, severely limit their usefulness to WDB personnel, who have limited time, and often, limited technical training.

Data Visualization Software: Some very good data visualization software packages and tools are available which can make large employer data sets easier to understand by transforming them into charts, graphs and maps. These include stand-alone, do-it-yourself products, such as Tableau and ESRI, or websites featuring labor market data already packaged in data visualization, such as the subscription-based EMSI and the publicly available EDD LMID.

In the former category, given the lack of technical expertise in WDB staffs, a substantial amount of investment would be required to set up the software system. Once set up, such system will likely be similar to the tools already available in the latter category. The limitation of these latter category tools is that due to their use of public data sources (from the EDD LMID), the data must be provided in an aggregated format. Both tools do additionally provide access to disaggregated proprietary data, including that from both InfoUSA and Equifax, but given that these lists are retrieved from data sources distinct from that used for the aggregate data, there is a cognitive disconnect in understanding the relationship among the statistics and the raw data lists.

Furthermore, though the aggregated data may be portrayed spatially on a thematic map, the business data are provided in a list format, making it hard to visually correlate the two. Additionally, no filter tools are provided to determine those companies which may be having financial difficulties. If a WDB wanted to run that query, it would need to purchase yet another database, D&B, in order to access the Financial Stress Score field. Finally, none of these visual analytics tools features any type of integrated outreach tools which would facilitate easy access to email contacts and enable the tracking of group comments across companies in priority sectors in need of business assistance. Rather, if a WDB wants to track outreach from within the group, the agency would either need to invest in CRM software or, as occurs most frequently, staff would simply maintain disparate spreadsheets of business lists, inviting both confusion and mistakes.

Customer Relations Management: If a WDB has invested in a CRM software system, such as salesforce.com or sugarCRM, the information in the tool is cognitively disconnected from the visual analytics tools. Simply put, it is difficult to visualize which businesses belong to which sectors, which sectors are priority sectors and to understand why. Though these tools are excellent for recording conversations and tracking a sales pipeline, they fall short of tracking outreach for the sake of business assistance as it relates to layoff aversion. Unfortunately, accidentally expending effort on a company which is not in a priority sector will not "count" as it relates to funding, which is tied to specific measures outlined in the WIOA. The lack of clear, visual cognitive connections between business database, visual analytics, and CRM/outreach tools may therefore not only be costly in staff time, but it may also cost the WDB in future funding.

Accordingly, a need exists for a system and method for providing enhanced web-based mapping services and functions for supporting a new layoff aversion process. Specifically, a need exists for such services and functions which (1) quickly determine the "priority sectors" within a region, (2) find the employers within these sectors exhibiting financial stress, (3) provide CRM tools for outreaching to these employers and documenting the effort, and (4) assist displaced workers in finding employment in similar companies within the region. Moreover, a need exists for such services and functions implemented as a Software-as-a-Service (SaaS) system.

SUMMARY

The aforementioned needs are satisfied by a system and method in which a computing system supports layoff aversion. The system includes a current and historical business Geographical Information System (GIS) with a database of a region and labor market web-services, a regional economy visual and spatial analytics interactive data visualization (IDV) Graphical User Interface (GUI), and a map-based customer relations management (CRM) GUI for local employer outreach map-based CRM.

The IDV GUI receives a selection of a geographic region of interest, and in response to the selection displays a visual representation of a number of major industry sectors present within the selected region. Each sector within the visual representation has a prominence therein corresponding to a prominence of the sector within the selected region. The IDV GUI then receives further selections of geographic sub-regions and/or industry sub-sectors of the selected region in order to focus onto local employers of interest in the region, receives a selection to obtain occupations, job listings, and/or business lists corresponding to a sub-region of interest and/or a sub-sector of interest, receives further selections to compile a list of employers of interest, and receives a selection to transfer the list of employers to the map-based CRM GUI.

The CRM GUI upon receiving the list and related information from the IDV GUI opens and displays a map focused on the selected region. The map displayed by the CRM GUI includes a map layer showing the selected region, and an overlaid point layer with a point representing a geographic location of each employer in the list of employers, whereby the list of employers compiled with the IDV GUI is spatially displayed by the CRM GUI. The CRM GUI then receives further selections to further compile the list of employers of interest, and receives a selection to apply a financial stress filter to the further compiled list of employers. In response to the selection to apply the financial stress filter, the CRM refers to an external database for a financial stress score for each employer in the further compiled list and based thereon determining which employers in the further compiled list are in danger of layoffs. The CRM GUI then receives a selection to store each employer in the further compiled list which is in danger of layoffs in a record in the GIS, whereby the employers in the record in the GIS may be the subject of a layoff aversion outreach campaign.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings:

FIG. 2 is a block diagram of a central server and a variety of computing devices;

DETAILED DESCRIPTION OF PREFERRED EMBODIMENTS

Figure 1:
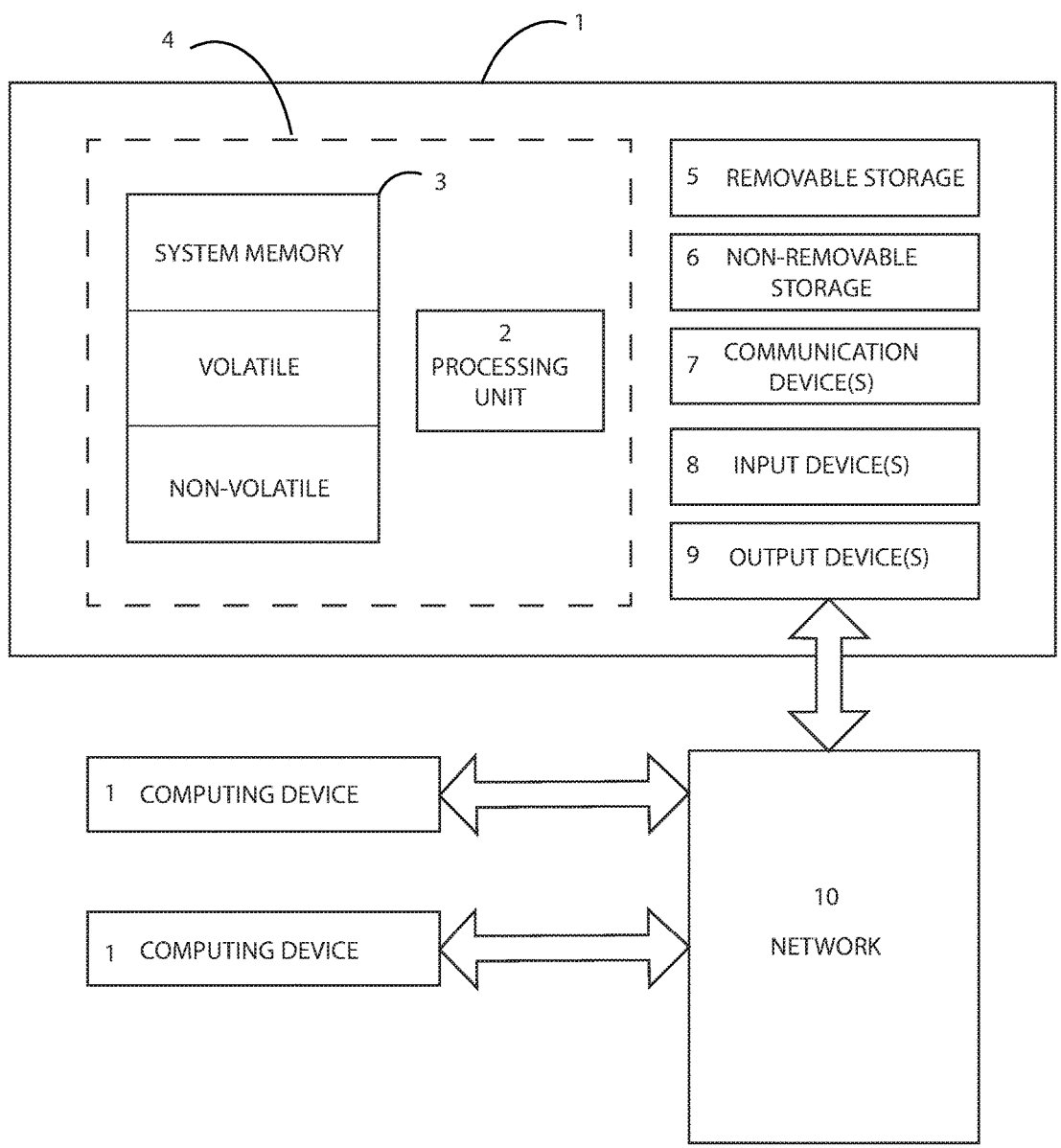
FIG. 1 is a block diagram of an example of a computing environment within which various embodiments of the present innovation may be implemented.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, aspects described by the plural of that term are also contemplated. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the relevant art. Although any methods and materials similar or equivalent to those described herein can be used in the practice or testing of the present innovation, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous variations of general purpose and special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, one system for implementing aspects described herein includes a computing device, such as computing device 1. In its most basic configuration, computing device 1 typically includes at least one processing unit 2 and memory 3. Depending on the exact configuration and type of computing device, memory 3 may be volatile (such as random access memory (RAM)), non-volatile (such as read-only memory (ROM), flash memory, etc.), or some combination of the two. This most basic configuration is illustrated in FIG. 1 by dashed line 4. Computing device 1 may have additional features and functionality. For example, computing device 1 may include additional storage (removable and/or non-removable) including, but not limited to, magnetic or optical disks or tape. Such additional storage is illustrated in FIG. 1 by removable storage 5 and non-removable storage 6.

Computing device 1 typically includes or is provided with a variety of computer-readable hardware media. Computer-readable media can be any available media that can be accessed by computing device 1 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 3, removable storage 5, and non-removable storage 6 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 1. Any such computer storage media may be part of computing device 1.

Computing device 1 may also contain communications connection(s) 7 that allow the device to communicate with other devices 1. Each such communications connection 7 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as acoustic, radio frequency (RF), infrared and other wireless media. The term computer-readable media as used herein includes both storage media and communication media.

Computing device 1 may also have input device(s) 8 such as keyboard, mouse, pen, voice input device, touch input device, etc. Output device(s) 9 such as a display, speakers, printer, etc. may also be included. In the present disclosure, it is contemplated that the touch input device is incorporated in the display in a manner that is generally known to the relevant public. All these devices are generally known to the relevant public and therefore need not be discussed in any detail herein except as provided.

Notably, computing device 1 may be one of a plurality of computing devices 1 inter-connected by a network 10, as is shown in FIG. 1. As may be appreciated, the network 10 may be any appropriate network, each computing device 1 may be connected thereto by way of a connection 7 in any appropriate manner, and each computing device 1 may communicate with one or more of the other computing devices 1 in the network 10 in any appropriate manner. For example, the network 10 may be a wired or wireless network within an organization or home or the like, and may include a direct or indirect coupling to an external network such as the Internet or the like. Likewise, the network 10 may be such an external network.

Particularly in the case where the network 10 is an external network, such network 10 may be a digitally based network (including VoIP) for exchanging computer data among the devices 1, may be an audio and/or video network for exchanging audio and/or video data among the devices 1, or the like. Thus, it may be that the network 10 may be a public switched telephone network for landline telephone communications, a mobile switching center for wireless telephone communications, a paging network for distributing paging information, a private multimedia network for establishing videoconferencing, or the like. Thus, it should be appreciated, that one or more of the computing devices 1 that are shown to the left of the network 10 in FIG. 1 may be a mobile telephone, a landline telephone, a pager, a mobile electronic mail device, a desktop electronic mail device, a mobile electronic texting device, a desktop electronic texting device, or a combination thereof, or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 10 or a distributed computing environment. Still further, aspects of the presently disclosed subject matter may be implemented in or across a plurality of processing chips or devices, and storage may similarly be effected across a plurality of devices in a network 10. Such devices might include personal computers, network servers, and handheld devices, for example.

Web-Based System for Regional Visual and Spatial Analysis with Integrated CRM—Overview The present disclosure introduces a Software-as-a-Service (SaaS) system for supporting a new layoff aversion process which includes (1) quickly determining the "priority sectors" within a region, (2) finding the employers within these sectors exhibiting financial stress, (3) providing CRM tools for outreaching to these employers and documenting the effort, and (4) assisting displaced workers in finding employment in similar companies within the region. This is done by way of a web-based SaaS system overlaying both a current and historical business GIS database of the region which integrates a regional economy visual analytics GUI (Region-Vue) with a web GIS for interactive business trend mapping (LocalVue) and a map-based CRM for local employer outreach which features a measure of financial stress (such as D&B's Financial Stress Score or the like) as a query filter (ProspectVue). All three components interlock and enable users to seamlessly carry data and queries across each, enabling analysis, documentation and editing at a wide number of scales and visualizations, from the region down to individual businesses. Furthermore, the integration of a filter for financial stress within the context of both regional analytics and a CRM enables visualizing the economic health of a region while providing the outreach tools to interact with, and potentially change, that health. The platform organizes all information via the North American Industry Classifications (NAICs) code groupings and sub-groupings.

RegionVue is an interactive data visualization tool, dynamically linked with LocalVue and ProspectVue, which features dynamic one-button time series reports for all industry sectors (from 2 Digit NAICS down to the NAICs 6 digit level), for counties and cities and pre-set "customer-defined" regions, dating back 5 years. Its visualization tools enable users to quickly understand a region's industry sector mix, including: (a) sectors that show a regional specialization, (b) the largest sectors, (c) sectors which are growing, both in employment and in wages and (d) the actual employers behind the numbers.

Reports feature time-series-based location quotient (used in determining how specialized a sector is in the region relative to the State), QCEW wage information and employment counts extracted from the underlying historical business database. All reports are visualized by animated time-series bubble charts, column charts, timelines, employment loss/gain graphs and raw data tables. An interactive time bar with a "play" button and interactive "year buttons" provides easy-to-use controls for animating the data across graphs and thereby revealing regional sector dynamics across time. Interactive charts which combine statistics (like location quotient) with animation instantly reveal emerging sectors with a regional specialization. All sectors can be drilled-down to generate region-specific business lists (revealing the actual employers behind the numbers), occupations, job lists and training programs. All visualization tools (including animated/interactive Bubble Charts, Column Charts, Timelines and Employment Loss/Gain graphs) are also available in drill-down mode. Job listings and region-specific occupational information are retrieved via job search web-services such as Indeed.com or the like and career information web-services such as CareerOneStop web-services or the like. Reports are downloadable as Excel spreadsheets and all chart graphics can be exported as JPEGS.

LocalVue is a visual business mapping analytics tool, dynamically linked to RegionVue and ProspectVue, which spatially displays industry sector trends by city, zip code and census tract. It is described in detail in U.S. Pat. No. 8,793,610, hereby incorporated by reference in its entirety. It dynamically generates reports for any selected region or radius around a point, including time series sector trends, business lists (displayed 3-dimensionally) and job listings. All region-specific industry trend profiles can be exported as Excel workbooks, with each worksheet being dedicated to sector employment statistics from year 2000. All maps can be exported as PDFs. Criteria and data can be dynamically transported from both ProspectVue and RegionVue, thereby portraying data within the context of an interactive thematic mapping GUI that facilitates rapid visual economic data comparisons among neighboring regions by selecting regions from the map.

ProspectVue, dynamically linked to RegionVue and LocalVue, is a map-based employer outreach tool combining a search interface with CRM. The search interface, described in U.S. Pat. No. 8,799,812, hereby incorporated by reference in its entirety, provides a map-based user input form for sending criteria to the underlying business database. After retrieving results, the search interface provides a series of filters for refining the list based upon company size, type and "financial stress." A map-based input feature enables users to further refine the search by tapping regions on the map to quickly add/remove companies within the associated region to/from the list.

The filtered results can then be imported into a "My List" CRM which is tied to a specific group account. The CRM provides tools to edit contacts/companies, assign filters, record comments shared among a group, drill down on any employer via a direct connection to the business database provider's servers such as the "D&B Direct" API or the like to retrieve company details and email/phone contacts, and use job search web-services to do a dynamic search of job listings at any selected company. Results may be exported as PDF reports or Excel spreadsheets and imported directly into an API for use by direct email campaigns such as MailChimp, ConstantContact or the like. A map-based calendar enables appointment scheduling with an eye to travel coordination.

Dynamic links between RegionVue, ProspectVue and LocalVue enable results to be passed between the apps for use in outreach tools and many types of visualization. When passing results from RegionVue to ProspectVue, for example, the ProspectVue app provides filters, including 6 digit NAICs, company size and financial stress, to help quickly identify which employers in a region's priority sector might be on the verge of layoffs. ProspectVue's map-based CRM, in turn, assists in employer outreach efforts with tools that record comments, import contacts and company details, enable task scheduling and facilitate email campaigns. Likewise, the ProspectVue app also quickly reveals which employers within the same sector exhibit strong financial health, providing a direct link to the job listings at that company retrieved via job search web-services. Thus it potentially facilitates the re-hiring of laid-off individuals in similar companies in the region.

The platform facilitates a region-based layoff aversion process that is efficient, accurate and far less costly in time and resources than previously existing processes. Through engaging with the platform, users may quickly identify which industry sectors are specialized in the region ("priority sectors"), find financially stressed employers within the priority sectors, and, with this targeted outreach list, retrieve contacts and deep company details on-demand, and then use CRM tools for recording conversations, scheduling, and performing tasks associated with employer outreach.

Web-Based System for Regional Visual and Spatial Analysis with Integrated CRM—Details Turning now to FIG. 2, it is seen that the present innovation may be implemented by way of a central server 11 or the like and is available as a fully functioning software and/or hardware system 600 available via most any web browser 13 or the like. All major databases for the system 600 reside on the central server 1 and are passed to the client web browser 13 via a high speed Internet connection or the like. More specifically, client side scripts from the web browser 13 send requests 12 to the central server 11 to retrieve information for maps, businesses, demographics, and other statistics which are to be displayed through the web browser 13.

Figure 3:
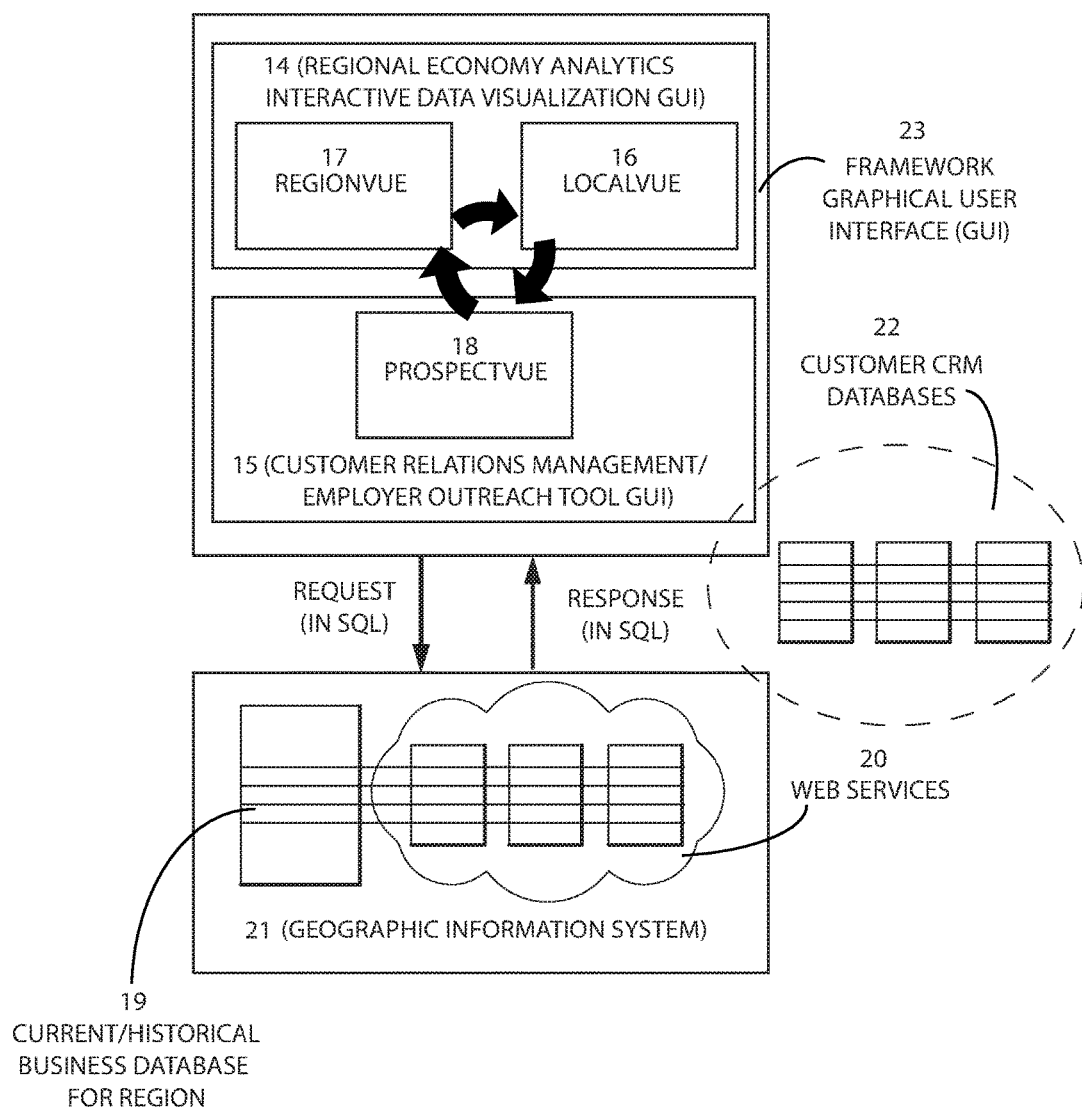
FIG. 3 is a block diagram of major system components.

Referring to FIG. 3, the present innovation features a regional economy analytics IDV GUI and labor market information system 14 integrated with a map-based CRM GUI 15 for employer outreach and consists of three integrated apps, "LocalVue" 16, "RegionVue" 17 and "ProspectVue" 18. LocalVue 16 and RegionVue 17 combine to form a regional economy analytics IDV GUI 14 and ProspectVue 18 is a CRM/employer outreach tool GUI 15. Users navigate back-and forth between all three apps to retrieve a variety of economic and labor market information at a wide array of scales, visualizations and interactive maps.

All apps connect to an underlying business database 19 which contains all companies in a region. Though any business database could be used, in this embodiment, D&B may be selected because of the system's reliance on a filter measuring a company's "financial stress", such as the "Financial Stress Score" which is unique to D&B. These business data are supplemented by labor market resources 20 including Quarterly Census of Employment and Wages from the Bureau of Labor Statistics (QCEW), an historical time series business database, such as, for example, an historical database of D&B address level data or the like for the United States; career information web-services, such as CareerOneStop web-services; and job search web-services, such as Indeed.com or the like. All data may be contained in a Geographical Information System (GIS) relational database 21. GIS ties all data to geography while the relational database relates all data sets to one another. Analytics tools 14 employ the whole business database of the region, while the CRM 15 enables the importing of a subset of these records into customer-specific databases 22.

Figure 4:
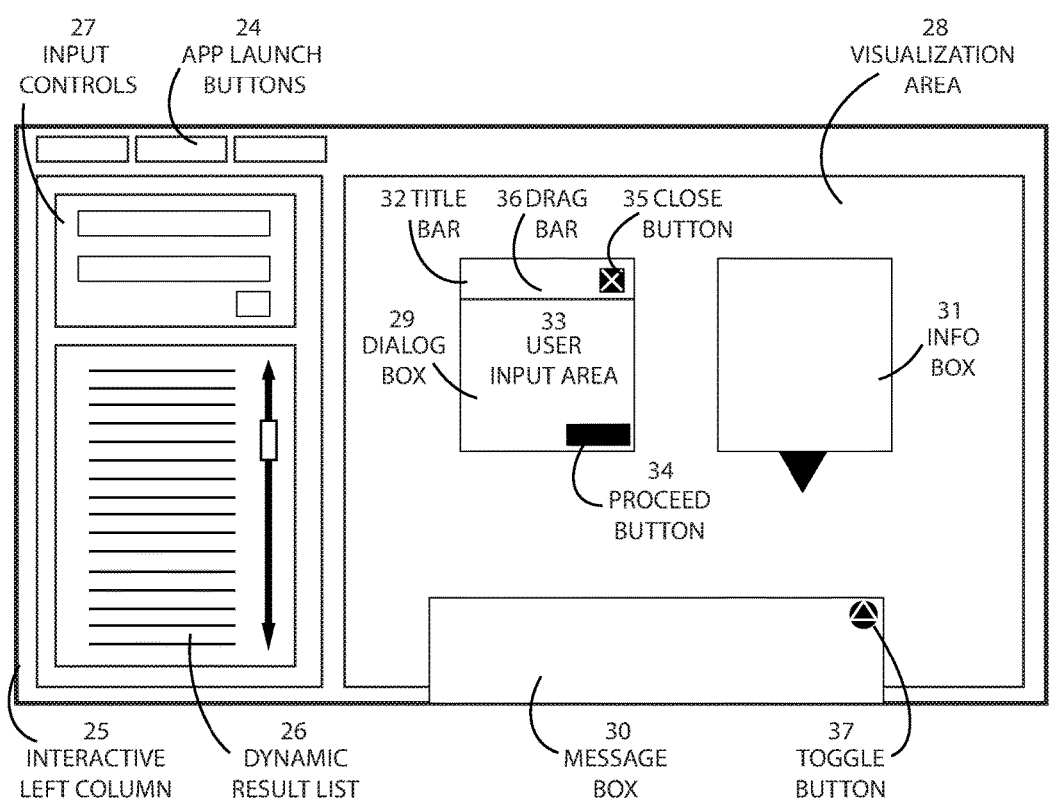
FIG. 4 is a block diagram illustrating the common layout and features of the organizing Framework Graphical User Interface.

The three apps 16-18 are situated within an overall "framework" GUI 23. Referring to FIG. 4, this framework GUI provides button controls for launching each app, features a common unifying layout that is shared among each, and provides a series of communication elements which guide the user from one app to another. Specifically, each app is accessed via a corresponding button 24 in the top left corner of the framework GUI. Clicking this button from within any of the apps will prompt the associated app to open and, in some cases, a dialog to open asking what type of criteria to carry from one app to another, such that the user may continue to examine the data within the context of different tools and visualizations.

All three apps 16-18 may share the same general layout: an interactive left column 25 with a dynamic result list 26 combined with input controls 27 and a large "visualization area" 28 occupying the right side. In the case of RegionVue 17, this visualization area 28 hosts graphs, charts and data lists. In the case of ProspectVue 18 and LocalVue 16, the visualization area 28 hosts an interactive map. This map is composed of an underlying mapping API and overlying system of interlocking point/polygon layers as described in U.S. Pat. Nos. 8,793,610 and 8,799,812.

All three apps 16-18 share a series of communication/interactive dynamic elements via the framework GUI 23 which appear/disappear based on various actions. These include a dialog box 29, a message box 30 and, in the case of the mapping apps, "infoboxes" 31 which are tied to elements which may be selected on the map. The dialog 29 appears as a standalone box centered in the middle of the framework GUI 23, with title bar 32, an area enabling user input 33 based upon prompts, a "proceed" button 34 and a "close" button 35. The dialog box 29 may be "dragged" and repositioned by the user via a drag bar 36 along the top. The message box 30 is an animated box positioned on the lower bottom edge of the framework GUI 23, sliding up and down and displaying messages pertinent to the user's actions. While the message box 30 is animated and moves on its own, a user may also manually control its position (up/visible or down/hidden) via a toggle button 37 located in the upper right corner. The map infobox 31 is described in detail in U.S. Pat. Nos. 8,793,610 and 8,799,812. An Infobox 31 appears whenever a region or business is selected and displays descriptive information related to that selected item.

Figure 5:
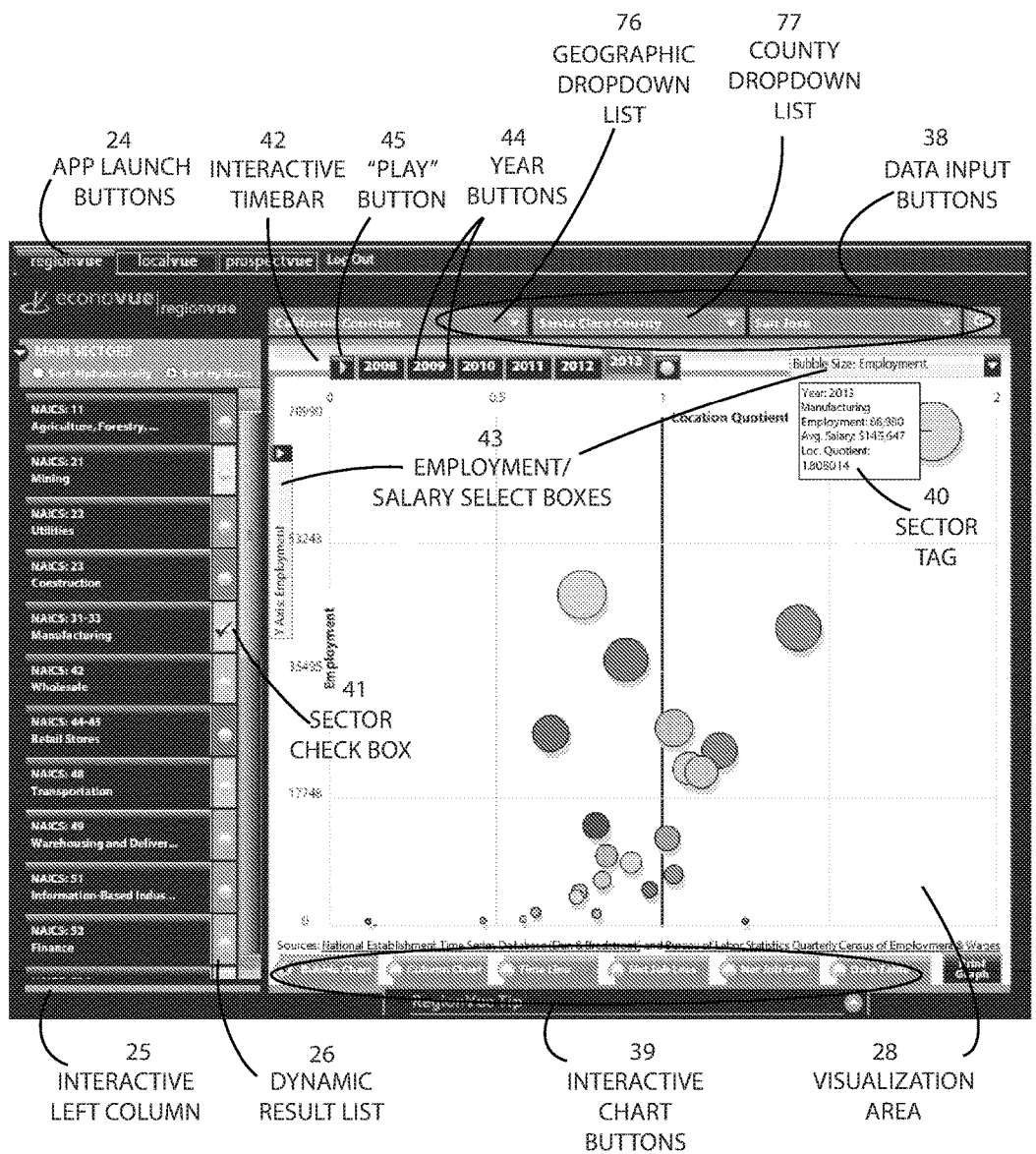
FIG. 5 is a block diagram illustrating the major features and layout associated with the RegionVue app.

RegionVue Layout: Referring to FIG. 5, the RegionVue GUI 17 features four major areas including (1) a top row of data input buttons 38, (2) a large visualization area 28 directly beneath the data input buttons 38, (3) a left-hand column 25 featuring an interactive list 26 and (4) a row along the bottom of the visualization area containing interactive buttons 39 which, when pressed, will display different graphs, charts and lists in the visualization area 28.

The visualization area 28 visually depicts industry sectors in a variety of different graphical representations. A user toggles among a series of different graphs and charts by pressing on the buttons located along the bottom 39 of the visualization area 28. The sectors in the visualization area 28 are rendered differently depending upon the display or chart chosen via these buttons 39, for example as bubbles, columns, lines, bars, and so on. The sectors are color-coordinated to match the colors of the sectors listed in the left column interactive list 26. All graphs/charts share the ability to tag sectors 40. This occurs when the user clicks on the sector in the visualization area 28 or when such user checks the right-hand area of the corresponding sector 41 in the left-hand column 25. When a sector is tagged, a small report attached to the sector 40 (as represented by a bubble, column, bar, line) will appear about that sector listing information such as the name of the sector, amount of employment in that sector, the average wage for that sector, and the location quotient.

Within the visualization area 28, various other controls may appear, depending upon user input. For example, an interactive "timebar" control 42 appears along the top in both the bubble chart and column chart visualizations. Also, "select boxes" 43 enabling toggling between employment and salary appear within several of the graphs and charts. These employment/salary select boxes 43 enable the user to define which data gets displayed via X and Y axis of a graph.

The interactive timebar control 42 features a series of buttons, with each button representing a year 44. Upon selecting a year button 44, the graph 28 is dynamically rendered based upon data extracted from the database for that year. The interactive timebar control 42 also features a "play" button 45. Pressing this button 45 animates the displayed chart 28 as the chart's information is dynamically redrawn from year-to-year causing a movement among the items in the visualization 28. Upon coming to a new year, a new year button 44 is automatically selected and rendered on the interactive timebar 42.

Figure 6:
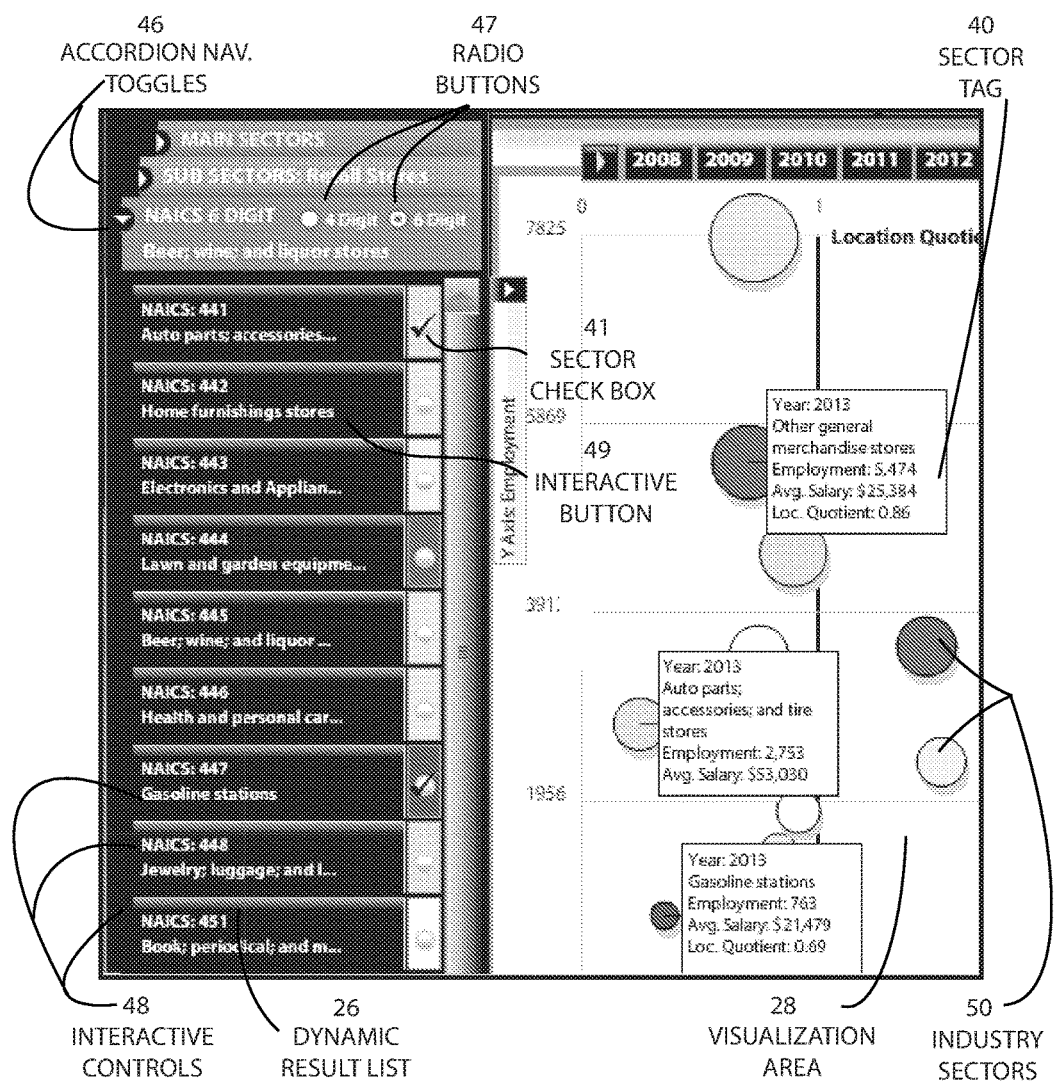
FIG. 6 is a block diagram showing the components of the interactive left column illustrated in FIG. 5.

Referring now to FIG. 6, the interactive left column 25 of RegionVue 17 can be broken into several components. The top row provides a toggle 46 which enables a user to drill up/down on NAICs codes via a method based upon accordion navigation. This area also includes radio buttons 47 which perform various actions, depending upon how far one has drilled into the information. For example, at the two or three digit NAICs level, radio buttons 47 enable the displayed information to be sorted either alphabetically or by NAICs code. At the four digit, or business level, radio buttons 47 enable the user to navigate between four and six digit NAICs levels.

The bulk of the left column 25 as shown in FIG. 6 includes an interactive list 26 which features each industry sector as depicted by a list of interactive controls 48 representing a series of two digit, three digit, four digit, or six digit NAICs codes, depending upon which level one has drilled down to. Each interactive control 48 combines an interactive button 49 with a checkbox 41. The checkbox 41 is color-coordinated with a corresponding industry sector 50 in the visualization area 28, making it easy to visually link the controls 48 with items in the visualization area 28. Clicking on the checkbox control 41 simultaneously places a checkmark on both the control 41 and tags 40 the corresponding item 50 in the visualization area 28. The reverse process also applies: clicking on an item 50 in the visualization area 28 places a checkbox on the corresponding control 41 in the interactive list 26. More than one control 41/sector 50 may be checked or tagged 40 in this manner.

The second component of the interactive control 48 of FIG. 6 is a button 49. Clicking the button 49 enables the user to drill down further in that industry sector. Upon clicking this button 49, the user retrieves the associated "next-level" of NAICs codes which is listed in the column 26 and rendered graphically in the visualization area 28. Unlike the checkbox 41, which enables more than one item 50 to be selected at the time, it may be that the button 49 only allows one item 50 to be selected at a time.

Figure 7:
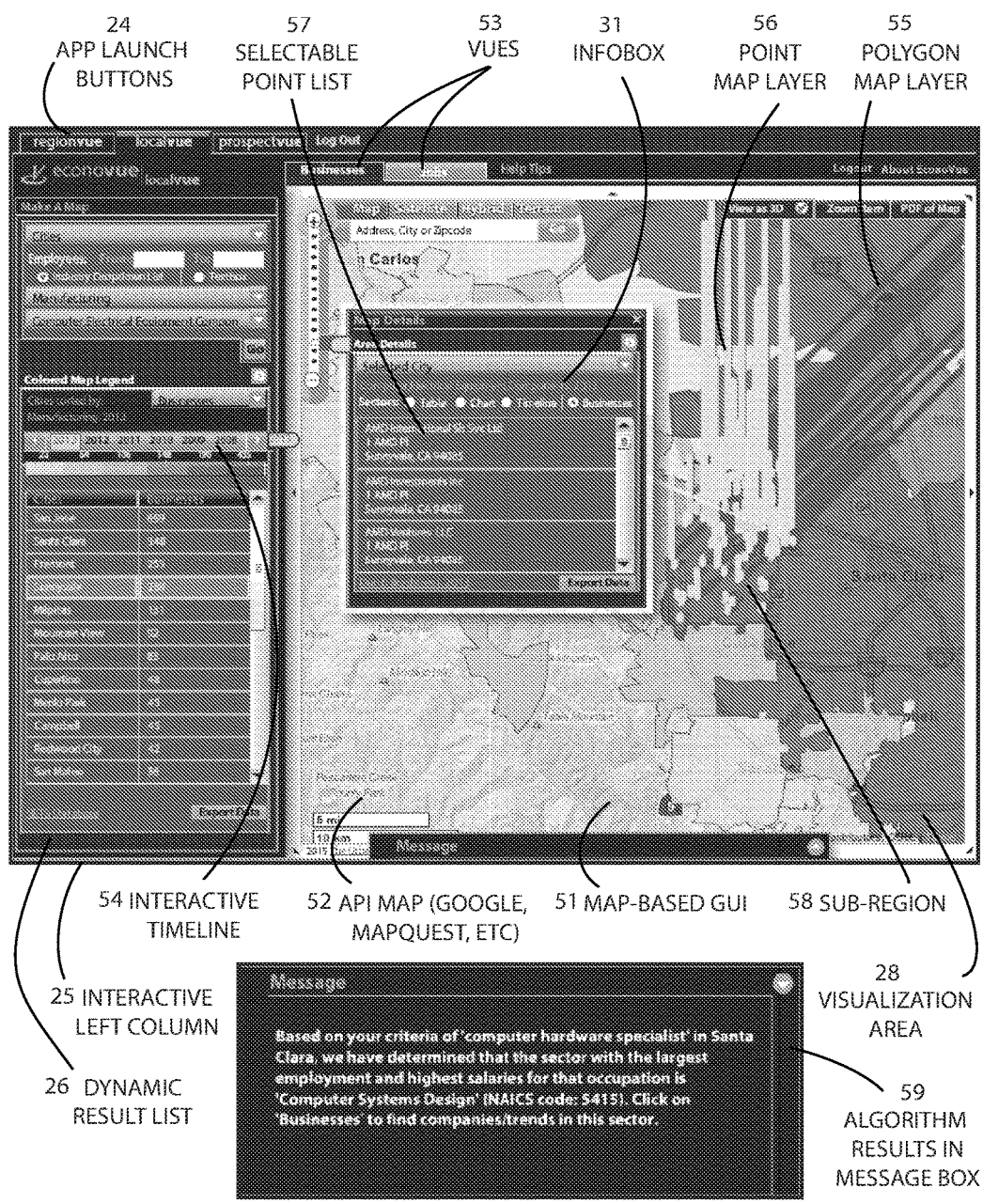
FIG. 7 is a block diagram illustrating the major features and layout associated with the LocalVue app.

LocalVue Layout: Refer to U.S. Pat. No. 8,793,610 for a detailed description of the LocalVue app 16. To summarize here, and referring now to FIG. 7, the LocalVue app 16 features a map-based GUI 51 that overlays a map from a web mapping service 52 such as Google Maps, Bing Maps, MapQuest, Yahoo Maps, or the like and provides multiple "VUEs" 53 to an underlying base map 52. A VUE is a themed "lens" into a locality as represented by the underlying map as provided by the mapping service. This lens is associated with a specific dataset, such as businesses, employment counts, land parcels, energy use, etc., and provides interlocked queries, thematic mapping, and 3-D temporal and spatial analysis tools to probe the dataset. Each VUE is tied to preset global variables which can be modified by the user, with preset interlocked queries, thematic maps and local area reports executing as soon as a user enters a VUE. For multi-year time series datasets, users can move between years via an interactive timeline/year-select control 54, providing a user with the ability to quickly see a three-dimensional spatial-temporal distribution of a database across a local area.

The VUE comprises a polygon layer 55 corresponding to the displayed map 52 and a point layer 56 corresponding to the displayed map 52, where the polygon layer 55 and the point layer 56 work in tandem to simultaneously display both aggregated and disaggregated data across the displayed map 52. In particular the point layer 56 overlays the displayed map 52 and shows for each of a plurality of specific items a location of the specific item on the displayed map 52. Each shown item is tied to and listed in a selectable point list 57 displayed by the GUI on the display. Likewise, the polygon layer 55 overlays the displayed map 52 and shows a thematic display of information aggregated to sub-regions on the displayed map. The aggregated information for each sub-region 58 is derived from the items in the point layer 56 located on the displayed map 52 within the sub-region 58.

Each shown item is tied to and listed in a selectable point list 57 displayed by the GUI on the display. Likewise, the polygon layer 55 overlays the displayed map 52 and shows a thematic display of information aggregated to sub-regions 58 on the displayed map 52. The aggregated information for each sub-region 58 is derived from the items in the point layer 56 located on the displayed map 52 within the sub-region 58.

A selection of one of the specific items of the point layer 56 or one of the sub-regions 58 of the polygon layer 55 is received from the user. In response thereto, both the point layer 56 and the polygon layer 55 are modified so as to provide additional selectable information corresponding to the received selection and also to provide additional selectable information that may be of interest to the user.

In various embodiments of the present innovation, an algorithm is executed every time a user runs a job search by clicking on the map while in the "Jobs" VUE 53, which uses the dynamically supplied criteria of region, year and occupation to run a query against the database of employment counts, salary range, and location quotient to return a NAICs code. The results are displayed in the message box 59.

ProspectVue Layout: Refer to U.S. Pat. No. 8,799,812 for a detailed description of ProspectVue's search interface. To summarize here, and referring now to FIG. 8, the search interface of the ProspectVue app 18 includes the following components: an interactive map 52, such as the Google, Bing, MapQuest or Yahoo Map available from the respective map service; a user input form, including (a) interlocked point/polygon map layers 60 which overlay the interactive map 52 and (b) input elements for descriptive criteria 27, such as a text box or a selectable dropdown list; a selectable list of returned results 26; and a dynamically-generated list of filters 61 which is generated client-side, and derived based upon sub-classifying the items in the list of returned results 26.

Figure 8:
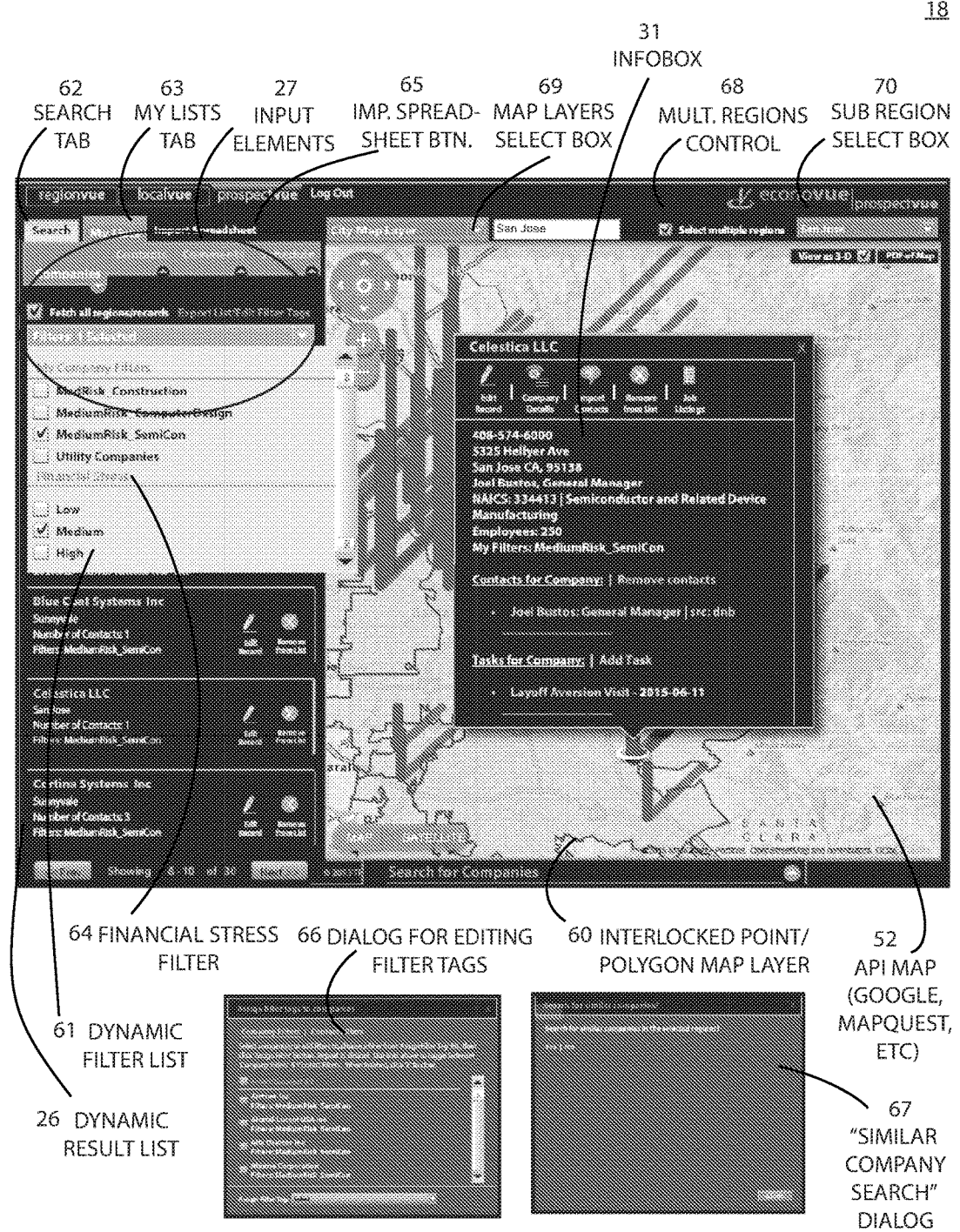
FIG. 8 is a block diagram illustrating the major features and layout associated with the ProspectVue app.

As seen in FIG. 8, the app's search interface integrates the map 60 as part of the user input form. Thus, a query is initiated by touching a polygon, query results are delivered in response thereto, and client-side functions analyze the results and group same into sub-categories which are dynamically rendered within a dropdown selectable filter list 61. This dynamically-generated list of filters 61 subsequently enables a user to quickly refine the query by tapping on a sub-category in the list, rather than re-typing a new category into a text box. The filter list 61 is generated so that results for the refined query are provided near-instantly. Combining interlocked point/polygon map layers 60 with dynamically-generated filters 61 enables fast repetitive searches of a large geographic area by simply touching the map and selecting new polygons.

In various embodiments of the present innovation, additional features are provided, including a toggle between "Search" 62 and "My List" 63, a "My List" CRM 63, a "financial stress" filter 64, an "Import Spreadsheet" function 65, a dialog for editing/adding custom filter tags 66, a "Search for Similar Companies" function 67, a "multiple regions" control 68, a "map layers" select box 69, and a "sub regions" select box 70. These elements are described in detail below with reference to the flowcharts of FIG. 9 et seq.

Figure 9:
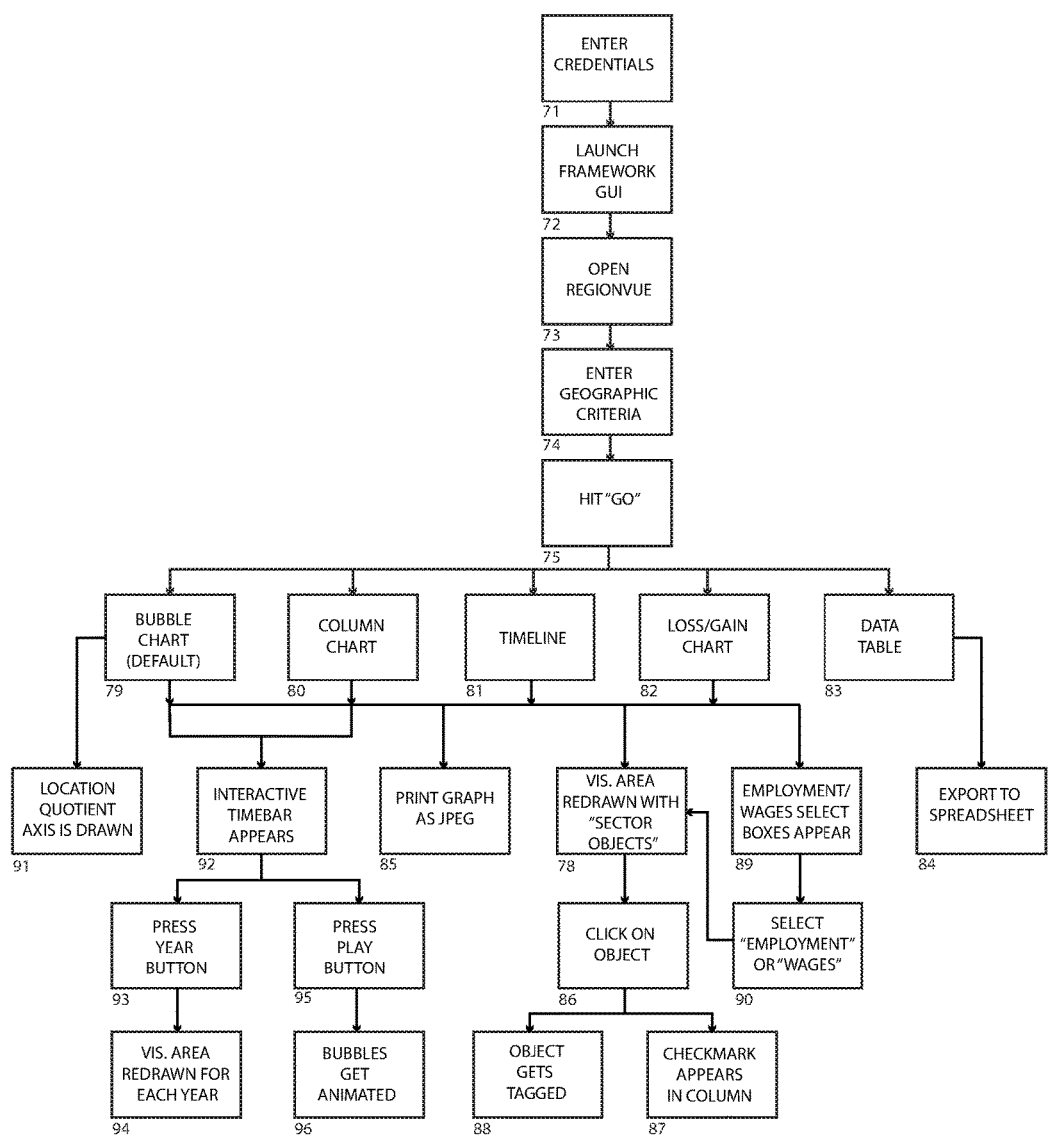
FIG. 9 is a flow diagram showing the initial launch sequence in opening the software to the default RegionVue app and the basic flow associated with the initial RegionVue search sequence.

Referring now to such FIG. 9 et seq., operation of the system 600 is disclosed. As shown in FIG. 9, after entering credentials tied to an account 71, a user launches the framework GUI in a separate browser window 72 and enters the default view of RegionVue 73. Once inside the Region-Vue app, the user engages the top row of data input buttons to enter which region s/he is interested in exploring 74, and hits "Go" 75. Specifically, and referring to FIG. 5, a dropdown list 76 offers the choice of either visualizing data by "Counties" or by "Workforce Investment Areas." If "Counties" is selected, for example, all of the counties in a State (such as California), will dynamically be displayed in an accompanying dropdown list 77. After selecting one of the counties from the list 76, such as Santa Clara County, and hitting "Go" 75, a number of things happen.

Referring back to FIG. 9, the first thing which occurs is that the visualization area 28 displays a bubble chart 79. A number of buttons lining the bottom also provide the ability to view the same information in various other visualizations, including a column chart 80, timeline 81, employment loss/gain chart 82 and raw data table 83, where a user can both view and download/export the raw data statistics to a spreadsheet 84. Any chart may be exported as a JPEG by pressing the "Print Graph" button 85 located along the bottom of the visualization area. Though the bubble chart 79 is examined in more detail in this disclosure, all of the features described herein are also manifest in the other visualizations.

The bubbles 50 in the visualization area 28 (FIG. 6) are directly connected with an interactive list 26 in the left column 25, in that each of the bubbles 50 and list items 26 represents an industry sector associated with one of the twenty-five major industry sector two-digit NAICs code classifications. The bubbles 50 are color-coordinated with the column listings 26 so one can select from the list and it will likewise select the corresponding bubble and vice-versa. Thus, when an object 50 or list item is selected 86, a checkmark appears 87 and when a bubble is selected, a "tag" is attached 88 with pertinent information about that sector (such as location quotient, average salary and amount of employment).

The bubble size and its vertical position in the visualization area are related to the employment size of the industry sector: the larger the bubble and the higher it is on the graph, the more employment in that sector. Note that a select box 89 provides the ability to toggle between both "employment" and "average salary" 90, and, as such, the bubble size/position may likewise be associated with size-of-salary.

A vertical black line in the center of the graph of FIG. 6 represents the baseline location quotient 91 for the comparison region (e.g., the State of California) with respect to the amount of employment in each industry sector. The baseline location quotient is "1." Any sector to the right of the black line, or with a location quotient greater than one, is more important within that region relative to the state of California. Thus, any sector to the right of the line is more specialized in a region.

Though the default year is that which is five years in the past, data visualizations from more recent years can also be viewed via an interactive timebar 92. Each year in the timebar is a button that, when pressed 93, repositions and resizes the bubbles within the visualization area according to the employment data for that year 94. Pressing the "play" button 95 on the timebar will animate the bubbles 96, causing the bubbles to reposition and resize across the graph in a fluid movement in accordance with the employment data for each successive year. Animation illustrates the dynamics of the movement of those sectors, for example, through a recession and then through a recovery.

The visual combination of bubbles which are large, high-up on the graph of FIG. 6 and to the right of the black line, makes it very easy to quickly see which sectors are the important "priority sectors" within a region. In addition, the animated timebar provides a visual method for quickly understanding the dynamics of a number of sectors relative to each other and to the baseline (e.g., State of California) across a period of time. Thus, the visualization tools make a complex set of time-series data and statistics into something which is very easy-to-understand and highly apparent.

A user can drill down into the regional data in two ways: by region and by industry sector. With regards to the former, whenever a County or Workforce Investment Area is chosen, all associated cities within that region are dynamically listed in a selectable dropdown list 77 (FIG. 5) located in the top row of data input buttons. By selecting different cities from this dropdown list, the user is able to quickly drill down to sub-county geographies and do quick visual comparisons of the industry sector distribution across these regions and the county as a whole.

Figure 10:
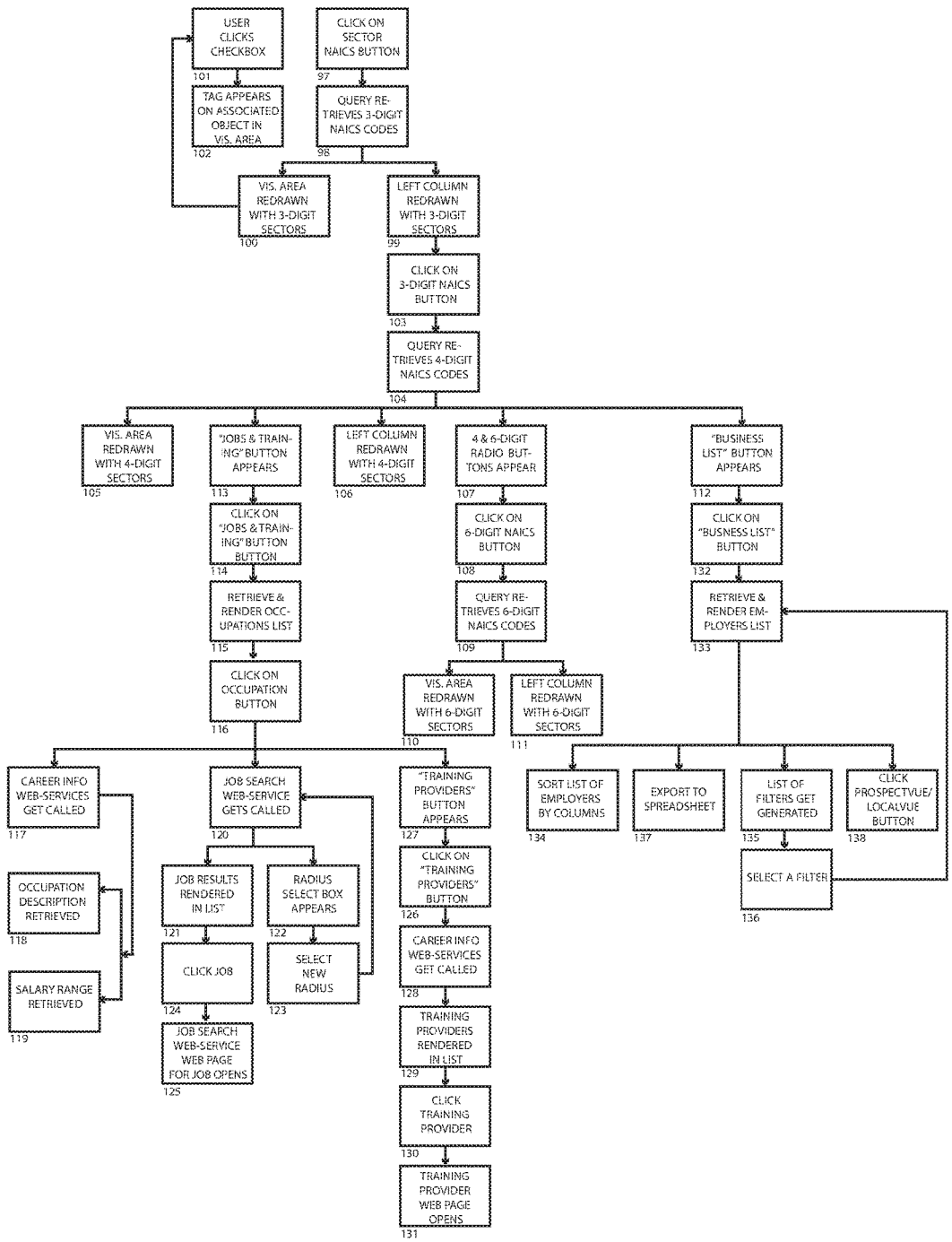
FIG. 10 is a flow diagram showing the sequence involved in "drilling down" in the RegionVue app to retrieve more detailed information.

The user can also drill down and understand each industry sector in greater detail. Referring to FIG. 10, this is done by tapping on an industry sector's corresponding button 97 in the left column interactive list (FIG. 6). For example, if the user is examining sectors at the two-digit NAICs level, s/he can click on an industry sector button 97 (e.g., "Manufacturing" or NAICs code "33"), a query retrieves data from the server 98, and the interactive list is populated 99 with all of the manufacturing sub-sectors at the three-digit level and the visualization area is redrawn 100 with bubbles which represent these sub-sectors. In the case of Santa Clara County, for example, the visualization area (FIG. 5) is redrawn with one large bubble in the top right corner and twenty smaller bubbles in the lower left corner. Immediately, the eye is drawn to the big bubble in the top right-hand corner of the chart. Clicking the bubble 101 creates a tag, indicating that this sector is "Other Electrical Equipment Component Manufacturing" (NAICs code "334") 102. Tapping, once again, on the corresponding button 103 in the left column fires a query to retrieve data from the server 104 and drills down to four digit NAICs, where the data visualization area is redrawn 105, the left column list is repopulated 106 and four and six digit radio buttons appear 107. Selecting the "6 digit" radio button 108 on top of the left column list (FIG. 6) disaggregates the information even further. After running the query to retrieve the data 109, redrawing the visualization area 110 and rendering the left column list 111, the user can easily see that there are two sub-sectors that are driving the regional specialization of manufacturing: "Semiconductor Manufacturing" (NAICs code "334413") and "Computer Terminal Manufacturing" (NAICs code "334418").

Once the user has drilled-down to either the four or six digit NAICs code level, two more buttons appear along the bottom of the left column: "Business Lists" 112 and "Jobs and Training" 113. Selecting either of these buttons retrieves detailed occupations, job listings and business lists which are keyed to the four or six digit NAICs code. For example, clicking on the "Jobs and Training" button 114 dynamically retrieves all of the occupations associated with that NAICs code 115, based upon correlating Occupational Information Network (O*NET) codes with the four digit NAICs codes. The occupations are depicted as clickable buttons in the left column interactive list. Clicking on one of these occupation buttons 116, "Computer Hardware Engineers" for example, will cause a number of web-services to execute. The career information web-service 117 retrieves a description of the occupation 118 (as per its O*NET code), the national median salary range 119, and the regional salary range 119 for that occupation. A job search web-service simultaneously is called 120, using the occupation name and region as keywords, retrieving current job listings 121 for the chosen occupation within that region. The user can compare the regional median salary ranges retrieved from the career information web-service as a way to judge the various job positions available. The geographical scope of the search can be adjusted via a dropdown list 122-123 (e.g., "exact region," "10 mile radius," "25 mile radius," "50 mile radius," etc). Upon clicking on any of the jobs in the retrieved list 124, the detailed job description is loaded in another web browser window 125, retrieved via the job search web-service. Thus, not only can the user read the job details, but s/he may also apply to the job on-line via the interactive form provided by the job search web-service.

Likewise, the user can press the "Training Providers" radio button 126, which appears in tandem with the web service calls 127, to call the career information web-service 128 and dynamically retrieve a list of training providers (e.g., colleges) 129 and associated programs for that specific occupation in the region. The training provider list is now displayed in the visualization area. As with the job listings, clicking on a training provider 130 causes a new browser window to open 131, displaying the web page of the training provider. Users may toggle between "Job Listings" and "Training Programs" via radio buttons located at the top of the list display.

Clicking on the "Business List" button 132 generates a list of all employers 133 from the business database in the selected region for the selected NAICs codes. The results are displayed as a list in the visualization area, just as were the job listings or training providers. Each column of information in the business list table is able to be sorted 134. As such, the user can sort by column labeled "Number of Employees" and quickly see who the largest employers are. Thus, for example, within the city of San Jose, in the NAICs code of 334413, the companies of Cisco and Hewlett-Packard employ the most people.

In tandem with the results returned from pressing the "Business List" button, the interactive list in the left column is now populated with a variety of selectable filters 135, dynamically generated based upon the attributes of the returned set of businesses, per the techniques described in U.S. Pat. No. 8,799,812. The filters are grouped in the two categories of "Size of Company" and "Type of Company." The "Type of Company" filters are determined by four or six digit NAICs codes, with all NAICs codes pre-selected in the bubble chart also being selected here. If one or more filters in the left column are selected 136, as indicated with a check mark, then only those companies which correspond to the chosen filters are displayed in the visualization area. For example, if the user wants to limit the list to just the largest employers in the region within chosen "priority sectors," then such user simply checks all filters listed under "Size of Company" which display range of "50 or more" employees 136.

At this point, the user can export the selected list of employers to a spreadsheet 137 by clicking on the "Export Data" button. Alternatively, the user can view the list of employers either in "LocalVue" or "ProspectVue" by clicking on the corresponding button 138 in the upper left corner of the framework GUI.

Link to ProspectVue

Figure 11:
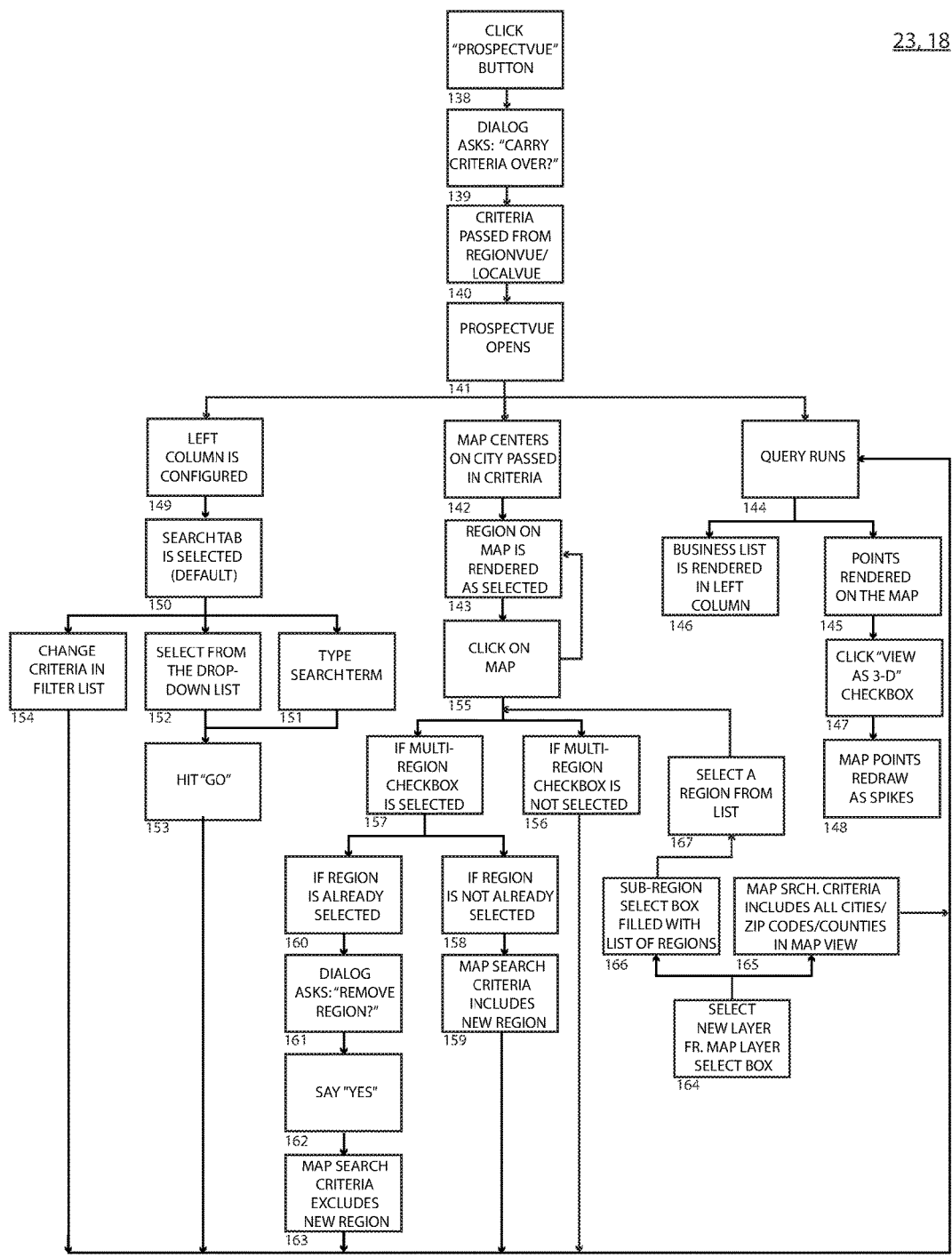
FIG. 11 is a flow diagram showing the sequence involved in launching the ProspectVue app from either the LocalVue or RegionVue apps, carrying criteria between the apps and engaging with ProspectVue's default "Search" view.

Referring to FIG. 11, pressing the "ProspectVue" button 138 will enable the user to carry the list of employers over to an integrated map-based CRM program. Once clicking the ProspectVue button 138, a dialog will ask the user whether to carry the search criteria over 139. If "yes," the ProspectVue app will carry all criteria passed from either RegionVue or LocalVue 140 and open 141, featuring a map focused on the same region 142 the user was examining in RegionVue.

Upon opening 141, the ProspectVue app will display a map layer corresponding to the chosen level of geography (i.e., cities, counties or Workforce Investment Areas), with the chosen region (for example, San Jose), rendered as a selected polygon on the map 143. A query simultaneously runs 144 based on the criteria and returns a list of employers which is both drawn as points within the selected polygon 145 and displayed in an interactive list in the left column 146. Thus, even though this is the same information as in the RegionVue display, it is now depicted spatially on a map. Clicking a "View as 3D" control 147 in the upper right corner of the map re-renders the mapped employers as spikes with drop shadows 148, with spike height correlating to size of company (per number of employees), so the higher the spike, the larger the company.

The left column is configured with two tabs 149: the "Search" tab and "My Lists" tab. The Search tab, selected by default 150, provides access to an interface for searching the entire business database. The "My List" tab provides access to a CRM and is described in detail below.

Search Tab: Within the Search tab the user may either fire a search by typing a term into a text box 151 or by selecting an industry sector from a set of dropdown search boxes 152 and hitting "Go" 153. Changing a filter in the filter list 154 will also prompt the search to run 144. This search has been covered extensively in U.S. Pat. No. 8,799,812, though for illustration purposes, some of the techniques will be described here. For example, employing touch/click-based interlocking point/polygon 155 and filtering techniques 154, the user may select more regions and businesses. All stored filters and criteria will be carried forth to any new region selected from the map 155. In so doing, the user quickly executes a search 156 which retrieves companies matching the criteria and pre-set filters 144 and renders them on the map 145 and within a list 146.

If the user wants to select more than one region at a time, such user checks-on the "multiple regions" control above the map 157 and then successively clicks regions on the map 155. If the regions are not already selected 158, each click 155 executes a query 144 which retrieves companies from the database matching the criteria (which includes the region 159) and renders the selected companies as 3-D spikes 148 or points on the map 145 and as items in the list 146. Each successive result set is added to the existing results, thus the list in the left column 146 will continue to grow and the number of points rendered on the map will increase 145. Each successive polygon region is also rendered on the map 143 along with those that have already been selected. Likewise, the user can subtract regions from the selection by using the same process: that is, if a region is already selected 160 and the user taps the associated polygon on the map 155, a dialog will appear which asks to remove the region from the selection 161. Answering "yes" 162 will prompt a redrawing of the map 145 and list 146 with the companies removed 163 and the polygon no longer rendered as being "selected" 143 on the map.

This search technique is good if the user wants to select multiple, but not all, regions (e.g., cities or zip codes) within a county. If, on the other hand, the user wants to quickly select all of the employers in the whole county per certain criteria, the user then selects "county layer" from the dropdown list of map layers 164. Upon doing so, a query executes 144, returning all of the companies within the county(ies) 165 per criteria in our stored filters. A county map layer will be rendered as per the interlocked point/polygon techniques described in U.S. Pat. No. 8,793,610 which portrays all associated counties and companies matching the criteria. Likewise, if the user moves in the opposite direction, from a larger aggregate map layer (like counties) to a more disaggregated one (like cities or zip codes) 164, the map will redraw 145, rendering just those city/zip code polygons 143 which actually have results. This is a fast way to quickly determine the list of sub-regions within which the selected businesses are located. A dynamically generated interactive dropdown list also appears which is populated with the sub-regions 166. The user may engage either this list 167 or the map 155 in removing businesses within certain sub-regions from the results 161.

Figure 12:
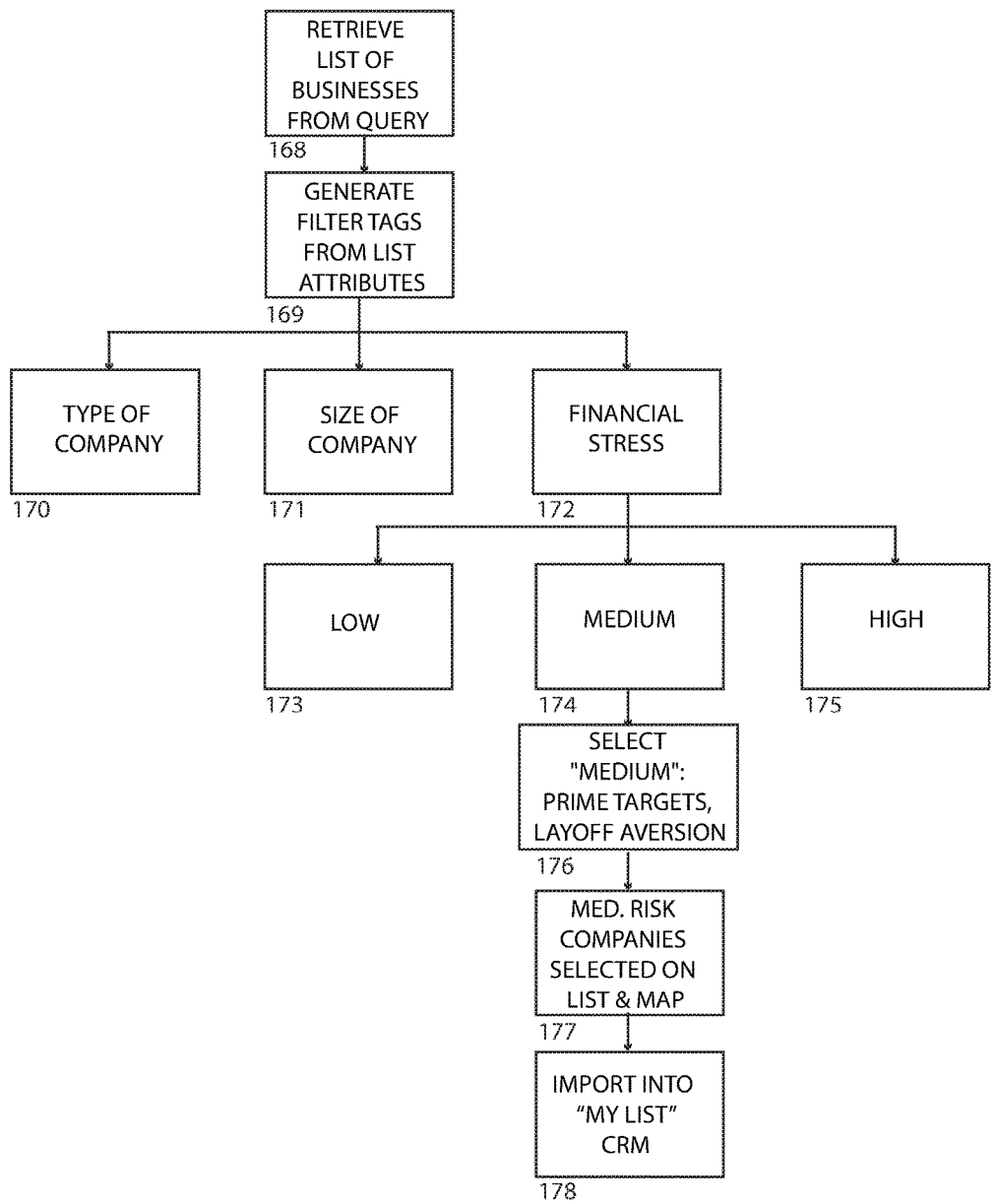
FIG. 12 is a flow diagram illustrating the process involved with using the "financial stress" filter from within ProspectVue's "Search" view.

Financial Stress Filter: Using the filtering techniques described in U.S. Pat. No. 8,799,812, a filter of the present innovation determines and displays the "financial stress" of a company. Referring to FIG. 12, upon retrieving a list of results from the database 168, the user generates a dynamic set of filters based upon various attributes shared by the list of results 169. The list of filter tag categories generated may include "Type of Company" 170, "Size of Company" 171 and "Financial Stress" 172. "Type of Company" 170 features a selectable filter list of all the NAICs codes embodied by the returned query results, and "Size of Company" 171 features a number of selectable filter ranges relating to the number of employees at each of the companies in the result list. The "Financial Stress" 172 filter may provide three selectable filters, including "low financial stress" 173, "medium financial stress" 174 and "high financial stress" 175. Once a user selects, for example, the "medium financial stress" filter 176, the companies with that attribute will be dynamically selected in the list and on the map 177. Using the "medium financial stress" filter now provides a list of the companies that may be on the verge of layoffs within the next year or so. These are the key employers that the user may want to do a layoff aversion outreach campaign to and thus import into "My Lists" 178 such that the user can access the CRM and outreach tools. Once the user imports records from the "Search" area into "My List" 178, the imported records are stored in a database dedicated to a group including the user. Those within this group can make edits, bring in contacts and schedule tasks and record comments with the records imported in "My List."

Figure 13:
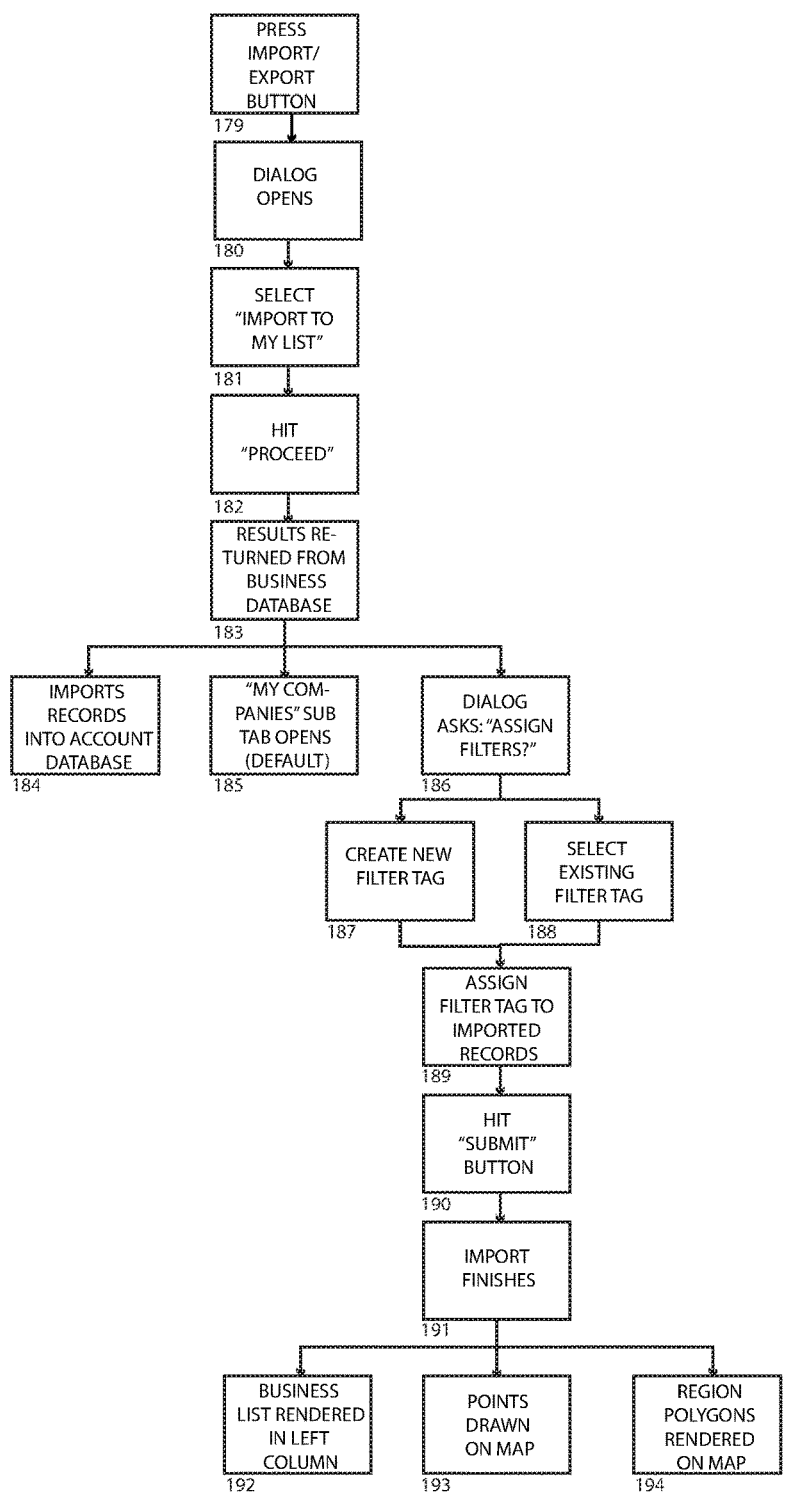
FIG. 13. is a flow diagram illustrating the importing of search results from ProspectVue's Search tab to its "My List" CRM tab and its default view of the "My Companies" sub tab.

"My Lists" CRM: Referring to FIG. 13, pressing the "import/export" button 179 from within the "Search" tab prompts a dialog to open 180. Selecting the "Import into My List" link 181 and then hitting the "Proceed" button 182 causes a series of queries to run which retrieve the corresponding records from the business database 183 and import them into a database dedicated specifically to the associated group account 184. There are four sub tabs within "My Lists", including "My Companies", "My Contacts", "My Comments" and "My Schedule."

"My Companies" sub tab: Once the records are imported 184 from either the "Search" tab or the "Import Spreadsheet" link, the user is redirected into the "My Lists" tab, which is opened to the "My Companies" sub tab 185. A dialog appears 186 which asks whether the user wishes to create a new filter tag 187 or assign an existing custom-defined filter tag 188 to the incoming records (the user can define filter tags for both companies and contacts). For example, the user will create a custom filter tag 187 named "Medium Risk Semiconductor" and then assign it 189 to the group of records being imported 184. After assigning filter tags 189, the user hits the "Submit" button 190 and the import finishes 191. Upon finishing, the newly imported records are rendered in the left column list 192 and drawn as points on the map 193 that are situated within the associated rendered region polygons 194. The user can now use these new filter tags to select companies which are meaningful to the specific group. Selecting that custom filter tag, in turn, will display the corresponding companies in the list and on the map, using the same techniques described above.

Figure 14:
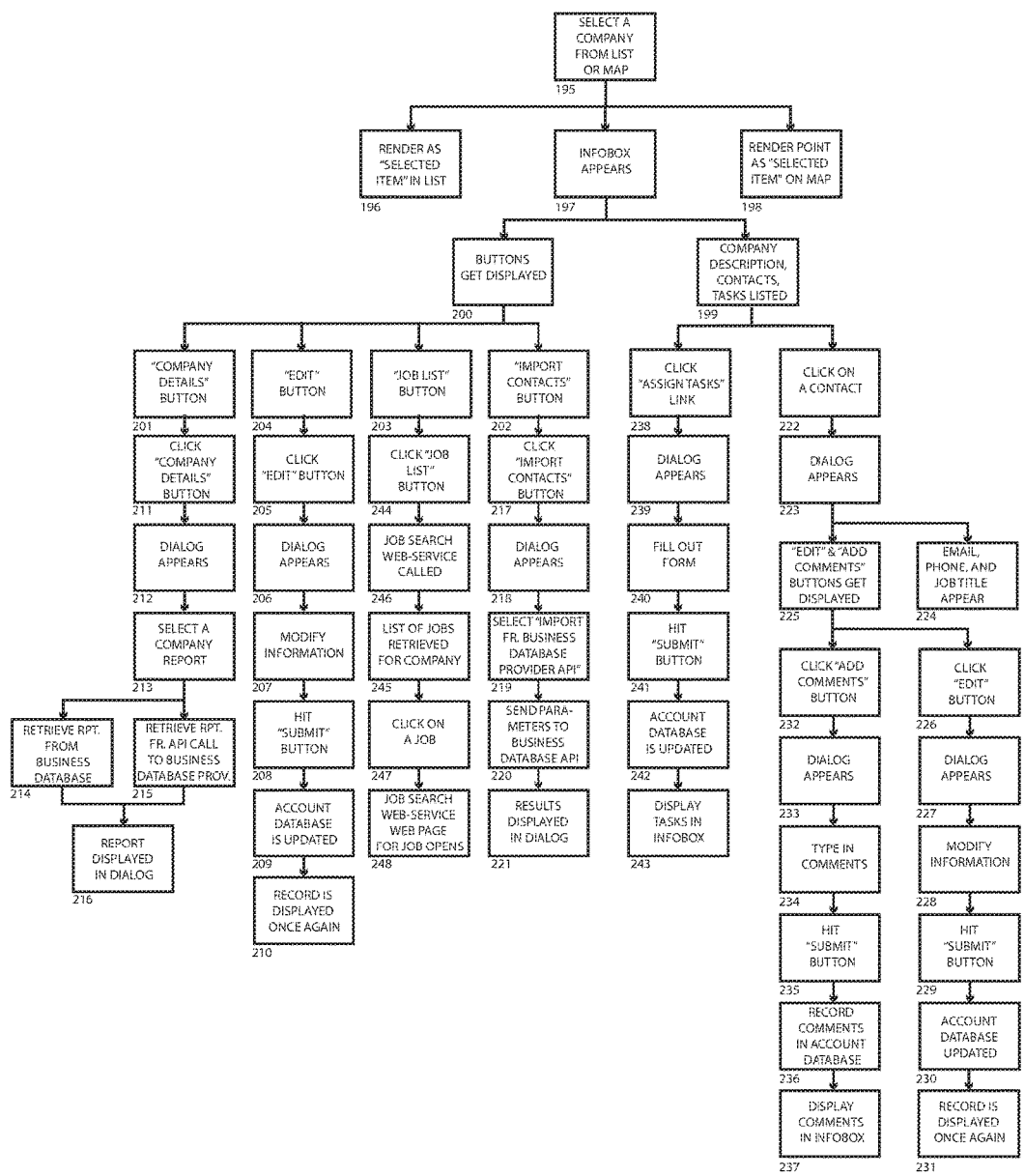
FIG. 14. is a flow diagram illustrating the usage of the "infobox" from within the ProspectVue "My List" tab.

Referring to FIG. 14, selecting any of the companies from either the map or the accompanying list 195 will render it as "selected" in the column list 196, display an infobox 197 rendered above the map and connected to the company pushpin/spike as drawn on the map 198. The infobox 197 displays more-detailed information about the record, including a short description, a list of contacts and a list of tasks assigned to the company, such as phone calls or scheduled site visits 199.

On the top row of the infobox, a row of buttons 200 enables the user to get company details 201, import contacts 202, retrieve company job listings 203 and edit the record 204. Clicking the "Edit" button 205 launches a dialog 206 which enables the user to make changes 207 and save certain fields associated with the company record. On hitting "Submit" 208, these changes are recorded in the account database 209 and the record is displayed with the updated information 210. The user can also assign/edit/delete filters from this edit dialog.

Clicking the "Company Detail" button 211 launches a dialog 212 which provides links to several different reports for the company 213. The "basic" report, retrieved directly from the database 214, simply displays all the data associated with the standard record layout which comes with the subscription. The other two reports are more detailed and provided on-demand via a web-service link 215. For example, if the user wants to review all the information that underlies the financial stress determination for a certain company, the "Comprehensive Risk Report" link will provide all of this information. Upon pressing the "Comprehensive Risk Report" link 213, a dynamic web-service call is made to the business database provider's server 215 to retrieve the most current information. The report is displayed in a separate dialog display window 216.

Clicking the "Import Contacts" button 217 brings up a dialog 218 featuring a number of ways to add contacts to a company, including (1) adding contacts by hand, one-at-a-time, (2) copying/pasting a list of contacts for this company from a spreadsheet, or (3) doing a live search for contacts through the business database provider's API web-service call. For example, if the user wants the contact information for the "Business Development" staff person of a company, the user chooses the "Import Contacts from business database provider API" 219, sets the job title criteria via select boxes, and hits the "Go" button 220. A live web-service call is made to the business database provider's servers 220 which then retrieves the list of contacts meeting these criteria and displays them in a dialog 221. Once contacts are imported the user can assign custom filter tags for use in search, in the same way as done for imported companies 181-191. If the user clicks on the imported contact 222, a dialog appears 223, displaying the email, phone number and job title 224. Buttons also appear 225 which enable the user to both edit this contact and add comments. To edit, the user clicks the "Edit" button 226, a dialog appears with editable text 227, where the user can make modifications 228. After hitting the "Submit" button 229, a query fires, updating the account database 230 and the modified information appears once again in the dialog 231. A similar sequence of steps occurs with either adding/editing a comment 232-237 or adding/editing a task 238-243.

Clicking the "Job Listings" button 244 dynamically retrieves job listings 245 for the company via a live call to the job search web-service 246. As described elsewhere in this disclosure, the user may click on any of the listed jobs 247 and a new web browser window will launch 248 which provides more details about the job and the ability to apply on-line.

Figure 15:
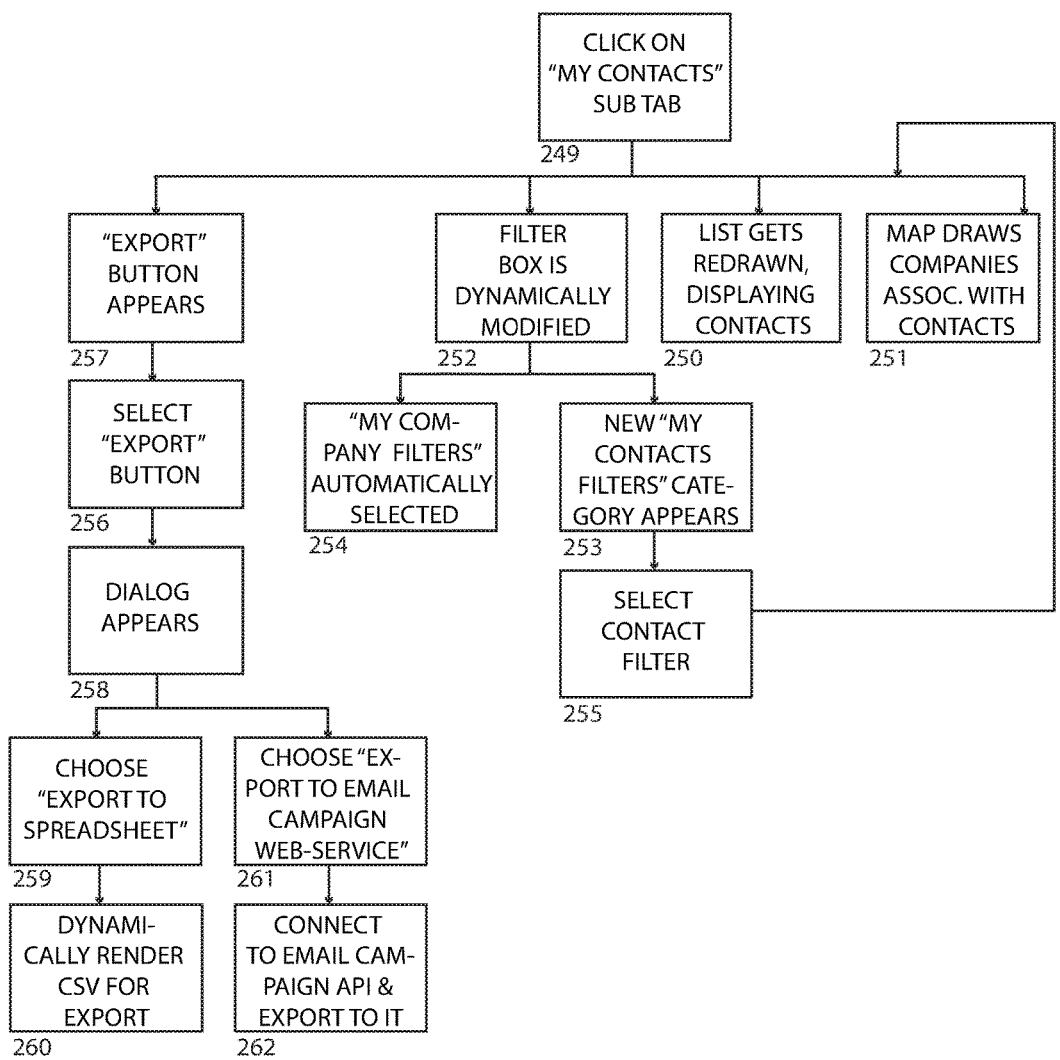
FIG. 15 is a flow diagram illustrating the opening of the "My Contacts" sub tab within "My List" CRM tab from within the ProspectVue app.

"My Contacts" sub tab: Referring to FIG. 15, clicking on the "My Contacts" tab 249 found under the "My Lists" sub-navigation will display the contacts within the companies as a searchable list 250 with an accompanied map display 251. Upon clicking that sub tab 249, the filter box is also modified 252 with a new category of "My Contacts Filters" 253. In addition, filter tags checked under "My Company Filters" while in the "My Companies" tab will remain selected 254, thus only displaying contacts within the companies which meet the selected filtered criteria. With regards to the new "My Contacts Filters" category 253, the custom filter tags the user created and assigned to contacts during import/editing will be listed here. This custom filter tag category 253 allows the user to select all contacts with a specific job title (for example "Business Development") 255 within all the companies meeting certain filtered criteria, making it convenient to engage in targeted outreach among a list of companies, per the criteria important to our specific work group. At this point, by selecting the "Export List" link 256 which also appears 257 upon clicking the "My Contacts" sub tab 249, a dialog launches 258 providing the choice of either exporting the list of filtered contacts to a spreadsheet 259-260 or exporting the list to an API web-service for assisting in email campaigns 261-262.

Figure 16:
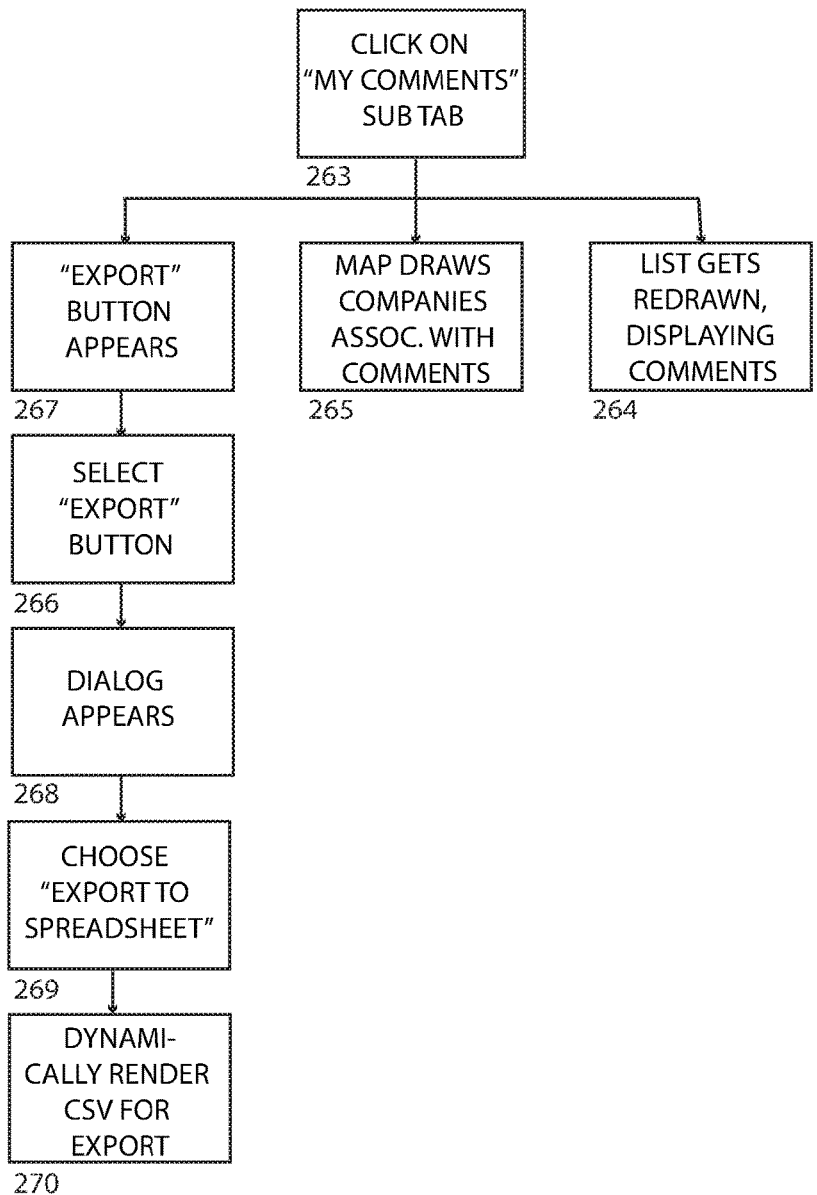
FIG. 16 is a flow diagram illustrating the opening and usage of the "My Comments" sub tab within "My List" CRM tab from within the ProspectVue app.

"My Comments" sub tab: Referring to FIG. 16, selecting the "My Comments" tab 263 found under the "My Lists" sub-navigation displays all comments recorded by members of an account's group during outreach efforts. The comments are displayed in a list 264 and on a map 265, making it easy to keep track of comments and conversations made by members of the group. Selecting the "Export List" button 266, which also appears 267 upon clicking the "My Comments" sub tab 263, prompts a dialog to launch 268, featuring an "Export to Spreadsheet" link which, when pressed 269, causes the list of comments to export to a spreadsheet 270 that aggregates and lists all of the columns required in a "122 report", including NAICs code, company size, address, priority sector designation, etc.

Figure 17:
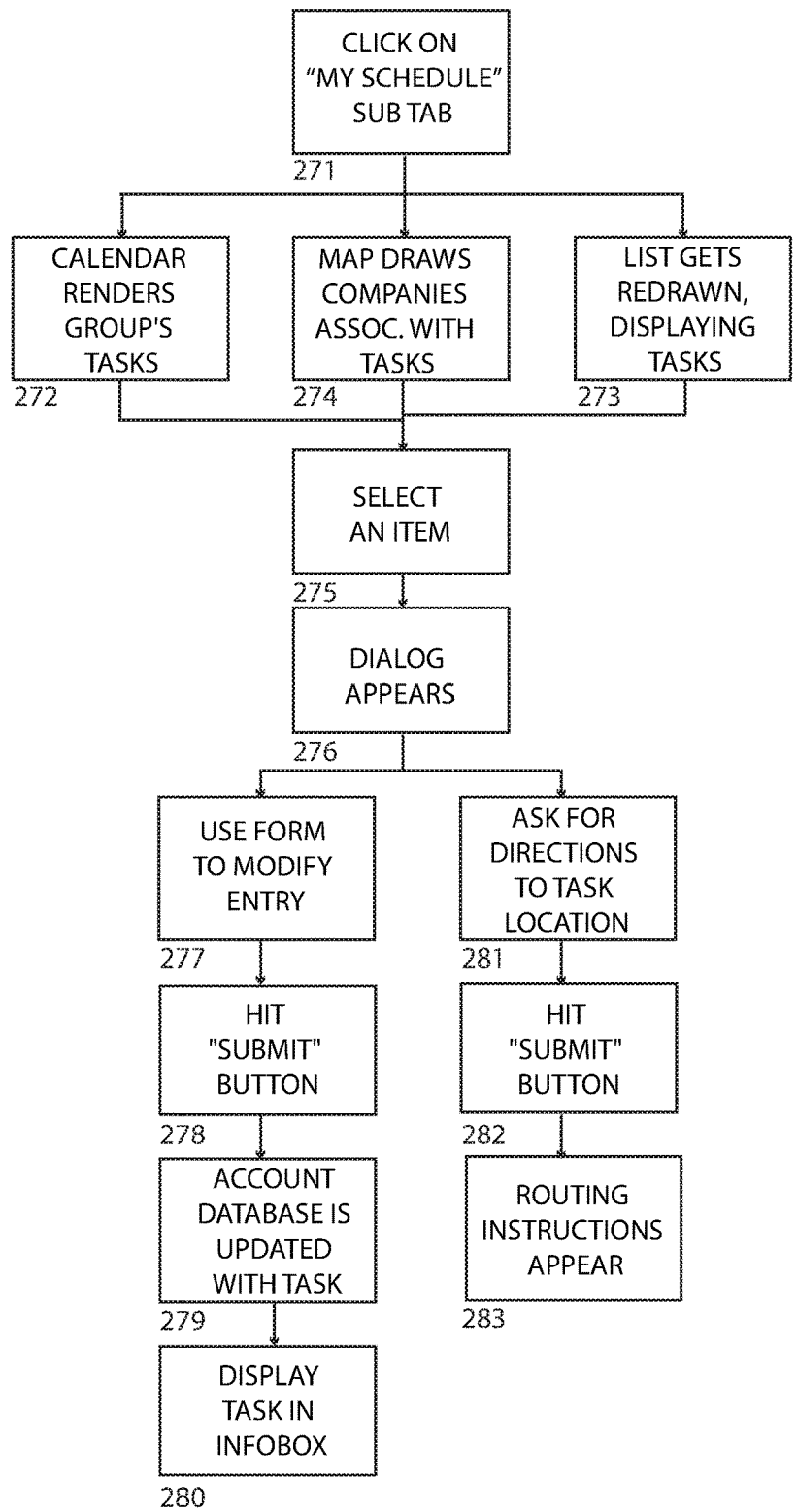
FIG. 17 is a flow diagram illustrating the opening and usage of the "My Schedule" sub tab within "My List" CRM tab from within the ProspectVue app.

"My Schedule" sub tab: Referring to FIG. 17, pressing the "My Schedule" tab 271 found under the "My Lists" sub-navigation will display a calendar 272, list 273 and map 274 of all the tasks that group members assigned to various companies. This section enables the user to simultaneously look at a calendar, list and map to see the appointments with these companies. Clicking on any of the calendar, list or map items 275 will display a dialog 276 that the user can use to edit the task via an input form 277. Upon hitting "Submit" 278, the account database is updated 279 and the modified task is once again displayed in the infobox 280. The user can also take advantage of the map-based routing inherent in the functionality of underlying mapping API service in order to assist in finding directions to appointments by indicating the need for directions to the task location 281. After hitting "Submit" 282, routing instructions appear in the dialog 283.

Figure 18:
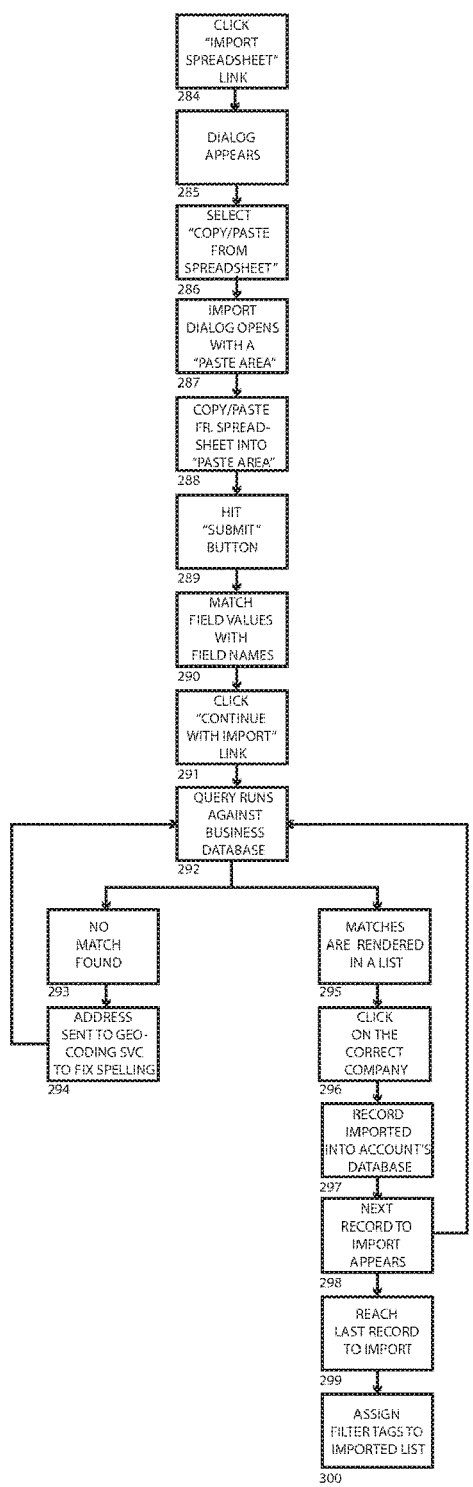
FIG. 18 is a flow diagram illustrating the importing of records via the "Import Spreadsheet" dialog from within the ProspectVue app.

Importing Companies/Contacts from a Spreadsheet: The user can import a list of companies and contacts from a spreadsheet into "My Lists" employing a data matching algorithm. Referring to FIG. 18, clicking on the "Import Spreadsheet" link 284 launches a dialog 285. The dialog lists the choice of either adding one company by hand or copying/pasting a list of companies and contacts from a spreadsheet. Choosing the latter 286 launches an import dialog 287 with a "paste" area which will accept input that is copied from a spreadsheet.

Once the user copies records from a spreadsheet, pastes them into this area 288, and hits "Submit" 289, the user is prompted to identify which required field names are associated with imported field values 290. For example, the user needs to identify which imported field contains the "company name," which is "street address," which is "city name," etc. Once finished, the user clicks the "Continue with Import" link 291. This action prompts a match algorithm to fire which does an initial query across the business database on the "company name" and "street address" fields 292. If a match is not immediately found 293, most often the reason is because the street address needs to be standardized. As such, in order to rectify this problem and standardize the address, another query is fired, engaging a web-based geocoding service which retrieves the proper standardization of the address 294.

Immediately upon retrieving the standardized format for the street address, the search against the business database is repeated on the "company name" and "street address" fields. If there is more than one company which either matches based upon the address or is similar in name, they will be placed in a list 295. After reading through this list and determining which company is the best match, the user clicks on that company 296 and it will then import into the "My List" database 297. The import script continues looping through all records 298 that were copy/pasted from the spreadsheet until all of the records have been imported 299. Once the import has been completed, the user can assign company filter tags 300.

Figure 19:
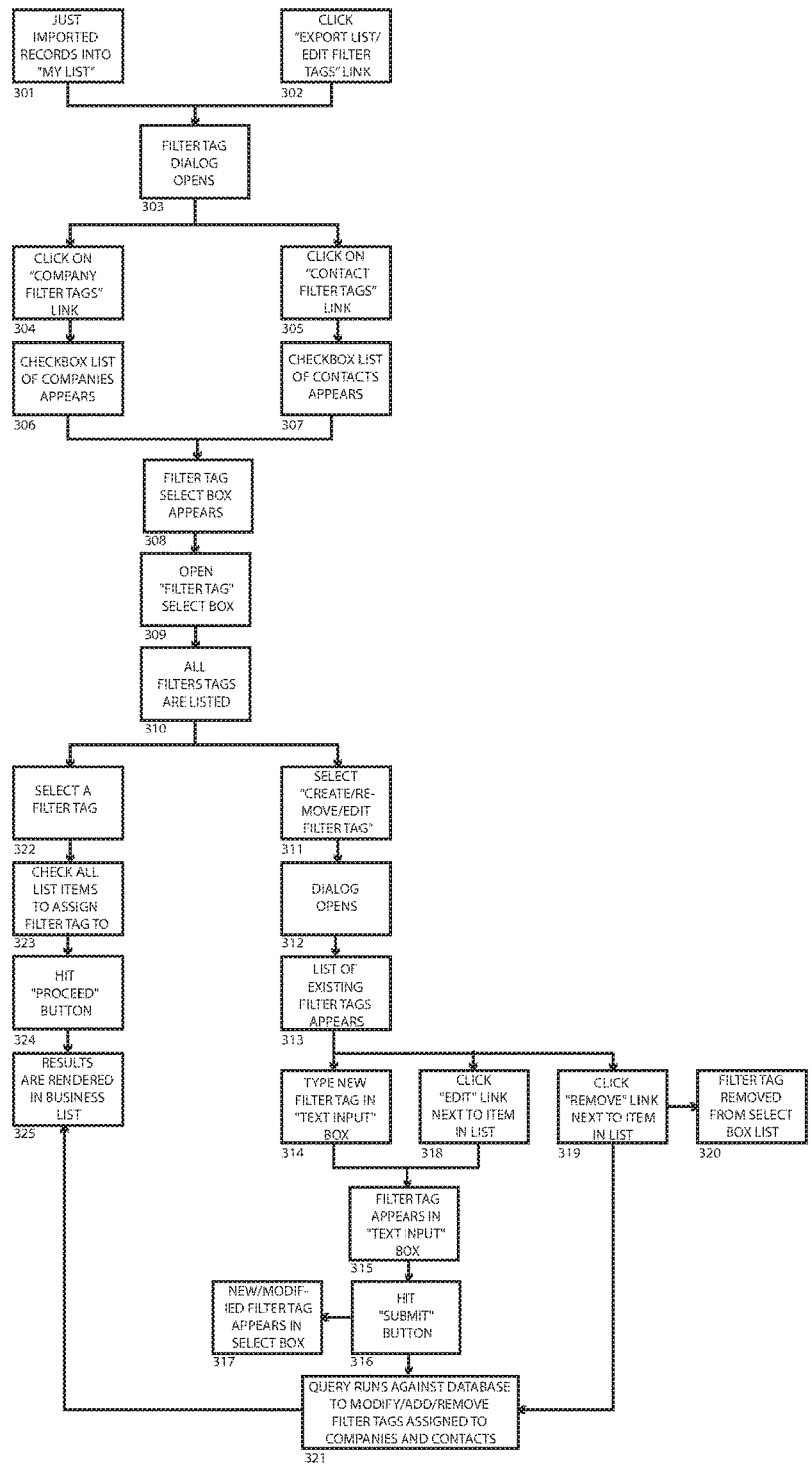
FIG. 19 is a flow diagram illustrating the editing/adding of custom Filter Tags via the "Export List/Edit Filter Tags" dialog from within the ProspectVue app.

Editing/Adding Custom Filter Tags: The user can add, edit or delete custom filter tags for companies and contacts in one of two ways. Referring to FIG. 19, in the first method, the user assigns filter tags when importing records 301 from either the "Search" tab or from the "Import Spreadsheet" function. The second method applies once records are imported. Clicking the "Export List/Edit Filter Tags" link prompts a dialog to open, listing the links: "Export the Spreadsheet," "Delete Records from Database," or "Edit Filter Tabs." Selecting the "Edit Filter Tags" link 302 opens a dialog 303 with all of the companies and contacts contained in the selected list. Note that the user can change the companies and contacts in this filter list by selecting different filters from the dropdown filter list.

The filter dialog has two links, "Company Filter Tags" and "Contact Filter Tags" and the user can toggle back and forth between them. To add and then assign a new or existing custom filter tag, the user clicks on either the "Company Filter Tags" 304 or "Contact Filter Tags" 305 links. This action prompts a checkbox list of all companies 306 or contacts 307 to be listed in the dialog and a Filter Tag select box to appear 308 on the bottom of this dialog. Opening the Filter Tag select box 309 will list all of the current filter tags 310. In addition to the list of current filter tags, the select box lists a choice called "Create/remove/edit filter tag". Selecting that choice 311 brings up another dialog 312, listing the existing filter tags 313 and prompting the user to add a new filter tag by typing it into the text input box 314-315 and hitting the "Submit" button 316. The filter tag now appears in the select box list 317.

The user can also edit any of the existing filter tags that are listed under the text input box, simply by clicking "Edit" link 318 and repeating the same procedure described for adding a filter tag 315-317. Clicking on the "Remove" link 319 will remove that filter tag from the select box 320.

Editing or removing filter tags in this manner simultaneously removes/edits the filter tag as assigned to all companies or contacts in the database 321.

Upon adding the new filter tag and hitting the "Submit" button, this dialog will close. The new custom filter tag now appears in the dropdown list of the filter tag select box 310. If the user selects that filter tag 322, checks all of those companies or contacts to be assigned thereto 323, and hits the "Proceed" button 324, then all the "checked" companies or contacts will now be assigned that new filter tag and rendered in the left column list 325. This new custom filter tag will also be listed in the filter dropdown list in the left column and the user can actively engage in selecting companies and contacts via the new filter tag.

Figure 20:
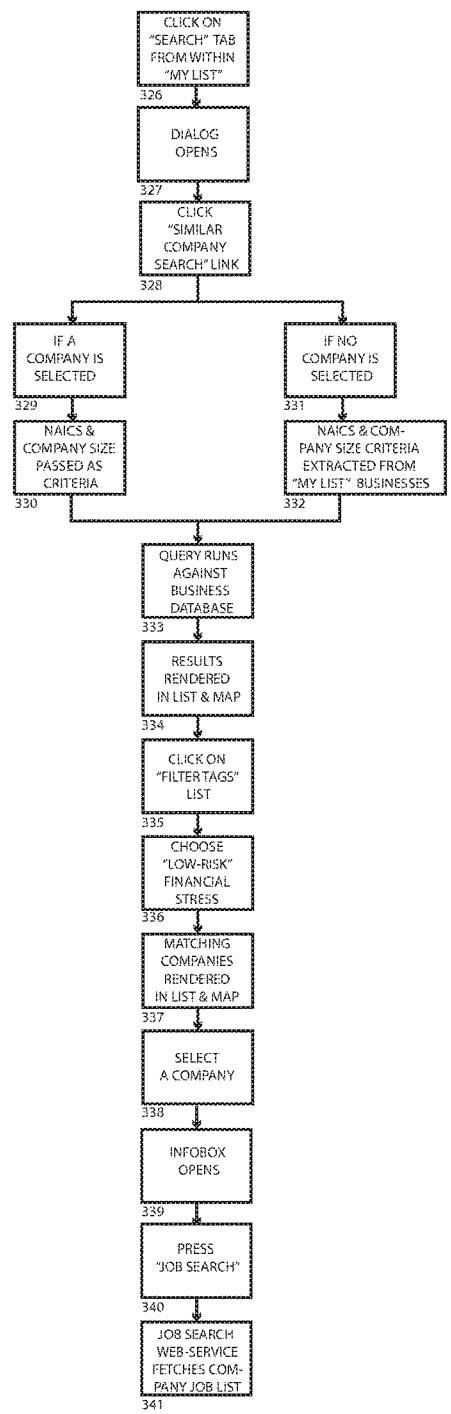
FIG. 20 is a flow diagram illustrating the process of running a "Similar Company Search" from within the ProspectVue app.

"Similar Company" Search: The user may toggle between the "Search" and "My Lists" tabs. Referring to FIG. 20, if coming from the "My Lists" tab into the "Search" tab 326, a dialog appears 327 which asks if the user wishes to engage in a "Similar Company Search" 328. This search uses certain attributes of the selected company 329-330 or, if no company is selected 331, attributes shared across companies currently displayed in the "My Companies" list 332, as criteria in a search of the business database 333. The results, rendered in the business list and drawn as points on the map 334, yield all companies sharing similar traits (e.g., NAICs code, number of employees) located in the region(s) selected in "My Lists."

To illustrate, suppose the user wants to help a soon-to-be-laid-off worker find local employment in a company that's similar to the one from which s/he is getting laid-off. With the company selected 329, the user presses on the "Search" tab 326. A dialog appears 327 asking to search for similar companies in the selected regions 328. If the user says "yes" and hits "Proceed," a search executes to bring up all companies sharing similar attributes in that region 333-334. To narrow the list to companies which likely won't be engaging in layoffs any time soon, the user can once again filter the list by the level of "financial stress" 335. This time though, instead of selecting the "medium risk" financial stress filter, the user selects the "low risk" financial stress filter 336. The result is a list of companies 337 within the same region that are similar to the selected company, but which exhibit a low financial stress and thus are not likely to engage in layoffs any time soon. Selecting any of these companies 338 from either the list or the map displays the infobox 339 for the company. Pressing the "Job Search" button 340 in the infobox executes a web-service job search and retrieves job listings for that company 341.

Link to LocalVue

Figure 21:
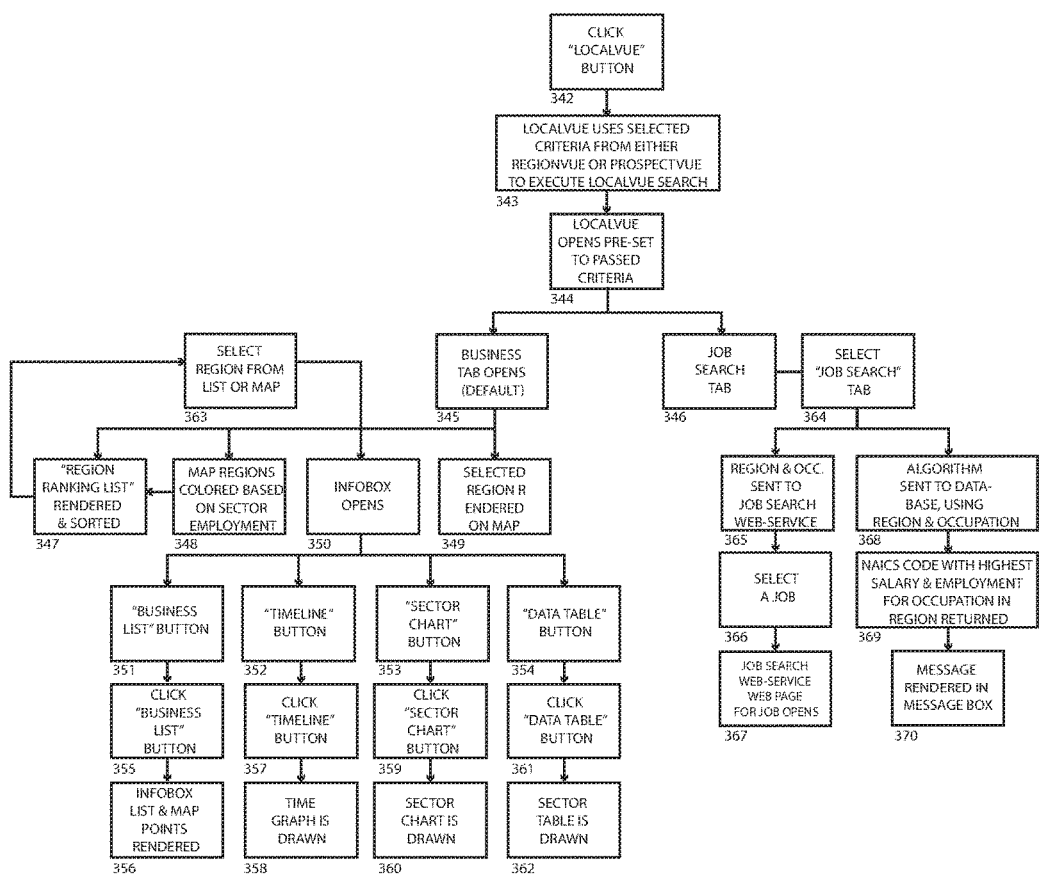
FIG. 21 is a flow diagram showing the sequence involved in launching the LocalVue app from either the ProspectVue or RegionVue apps, carrying criteria between the apps and engaging with LocalVue's "Business" and "Job Search" VUEs.

The user can jump to either RegionVue or LocalVue from ProspectVue. Referring to FIG. 21, clicking on the "Local-Vue" button 342 enables the user to carry all currently selected search criteria from either RegionVue or Prospect-Vue 343 and display information in a series of additional map-based formats, as described in U.S. Pat. No. 8,793,610. For example, LocalVue will use the criteria of selected region and industry sector and dynamically render the map such that it's centered on the region, dynamically pre-sets all search criteria in the search criteria input boxes and executes LocalVue's search 344. As described in U.S. Pat. No. 8,793,610, the "Business" VUE tab is selected by default 345 (the "Job Search" VUE tab will be visible but not selected 346), the Region Ranking List will be populated with all regions displayed in the map view and dynamically sorted based upon the amount of employment in each region for the chosen sector 347, and the map polygons will be thematically colored 348 to show which regions have more or less employment relative to all other displayed regions. The selected region will be rendered as such on the map 349 and the infobox will be open 350, enabling the user to toggle across displays of "business list" 351, "timeline" 352, "sector chart" 353 or "data table" 354. For example, clicking the "Business List" button 355 prompts the businesses in the selected region to be rendered as a list in the infobox and rendered as points on the map 356. Clicking the "Timeline" button 357 will prompt a time graph to be drawn in the infobox 358, portraying the region's fluctuation in employment across time. Clicking the "Sector Chart" button 359 will render a bar chart 360 of the employment within all industry sectors in that region. And, clicking the "Data Table" button 361 will render a table 362 of the employment totals within all industry sectors in that region.

Clicking the map 363 to select other regions will execute functions which retrieve time-series and business list data for each region. Engaging in this exercise enables the user to quickly visually compare regions with each other in terms of employment across time for a given sector.

Selecting the "Job Search" tab 364 contained within LocalVue will enable the user to do a region-based dynamic web-service job search 365, using the same job type criteria that may have already been defined within RegionVue. Selecting any jobs 366 displayed in the list provides a summary of the job and also furnishes a link to the employment web-service website. Pressing this link will launch another web browser window 367 with the detailed job description loaded in as retrieved from the job search web-service.

Simultaneously when doing a job search, an algorithm runs in the background 368 comparing all NAICs codes associated with that occupation within that particular region, and choosing the one featuring the highest salary and highest employment 369 and rendering the results in the message box 370. So, for example, for the occupation of "Computer Hardware Engineers", the NAICs code chosen for the selected region is 5415 ("Computer Systems Design"). Selecting the "Businesses" tab 345 contained within Local-Vue, in turn, retrieves a list of all the businesses in that sector in that region 356. At this point, the user can either look at or export the businesses in that list or, can jump back-and-forth between RegionVue and ProspectVue, carrying our search criteria among each app and accessing the additional tools and visualizations available across all apps.

Link to RegionVue

Figure 22:
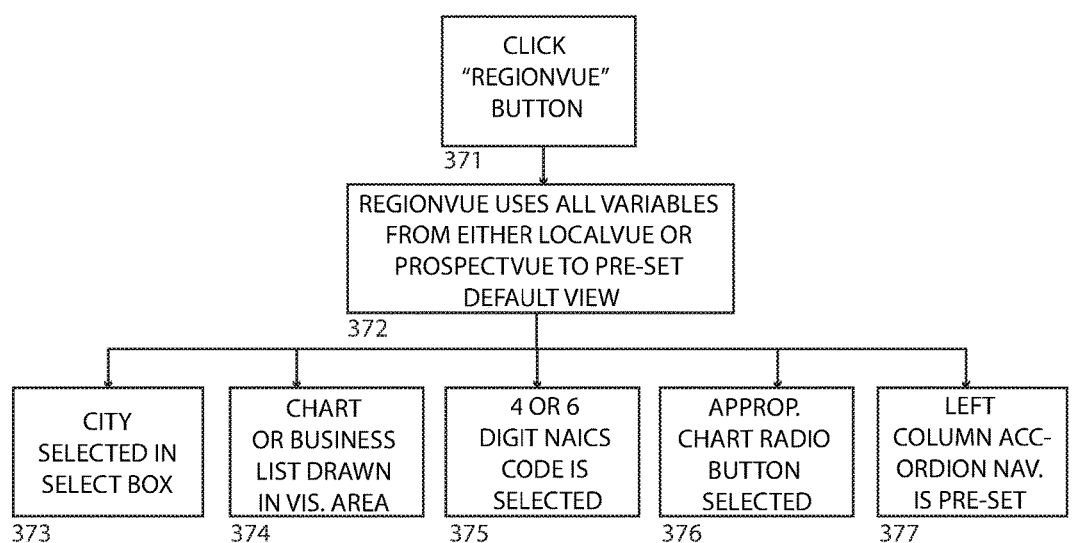
FIG. 22 is a flow diagram showing the sequence involved in launching the RegionVue app from either the ProspectVue or LocalVue apps, carrying criteria between the apps and pre-setting RegionVue's default view based upon the variables passed.

Referring to FIG. 22, to launch RegionVue from either LocalVue or ProspectVue, the user selects the RegionVue tab 371 in the upper left-hand corner of the framework GUI. The RegionVue app then carries the variables from the previously visited app in order to dynamically present the data in the proper visualization for the selected region 372. Thus, upon opening, it will feature the selected city 373 being carried from either LocalVue or ProspectVue. Likewise, the type of chart/list display which appears in the visualization area 374 depends upon the level and type of data the user was examining in the previous app. Accordingly, RegionVue will dynamically set parameters, such as four or six digit NAICs code 375, pre-select the visualization area radio buttons (i.e., bubble chart, timeline, job listings, business list) 376 and set the left column accordion navigation 377 to be reflective of the data representation being examined in the previous app. Once in RegionVue, all the features described previously are available for use.

CONCLUSION

The programming believed necessary to effectuate the processes performed by the computing system 600 in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a method and mechanism are set forth for providing enhanced web-based mapping services and functions for supporting a new process for economic analytics and business outreach, including layoff aversion. The method and mechanism (1) quickly determines the "priority sectors" within a region, (2) finds the employers within these sectors exhibiting financial stress, (3) provides CRM tools for outreaching to these employers and documenting the effort, and (4) assists displaced workers in finding employment in similar companies within the region. The method and mechanism may be implemented as a Software-as-a-Service (SaaS) system or the like.

It should be appreciated that changes could be made to the embodiments described above without departing from the innovative concepts thereof. For example, although the present innovation is set forth primarily in terms of WDBs, the WIOA, layoff aversion, and the tasks carried out in connection therewith, the techniques, methods and processes presently disclosed may be applied across any number of other users, uses and disciplines. It should be understood, therefore, that this innovation is not limited to the particular embodiments disclosed, but it is intended to cover modifications within the spirit and scope of the present innovation as defined by the appended claims.

The invention claimed is:

1. A method for supporting economic analytics and business outreach, including layoff aversion, the method employing a system comprising:
a current and historical business Geographical Information System (GIS) including a database of a region and labor market web-services;
a regional economy visual and spatial analytics interactive data visualization (IDV) Graphical User Interface (GUI); and
a map-based customer relations management (CRM) GUI for local employer outreach map-based CRM,
the method comprising:
receiving a selection via the IDV GUI of a geographic region of interest, the IDV GUI in response to the selection displaying a visual representation of a number of major industry sectors present within the selected region, each sector within the visual representation having a first visual prominence therein corresponding to a first numerical prominence of the sector within the selected region, and a second visual prominence therein corresponding to a second numerical prominence of the sector within the selected region;
receiving further selections via the IDV GUI of geographic sub-regions and/or industry sub-sectors of the selected region in order to focus onto local employers of interest in the region;
receiving a selection via the IDV GUI to obtain occupations, job listings, and/or business lists corresponding to a sub-region of interest and/or a sub-sector of interest;
receiving further selections via the IDV GUI to compile a list of employers of interest;
receiving a selection via the IDV GUI to transfer the list of employers to the map-based CRM GUI;
the CRM GUI upon receiving the list and related information from the IDV GUI opening and displaying a map focused on the selected region, the map displayed by the CRM GUI including a map layer showing the selected region, and an overlaid point layer with a point representing a geographic location of each employer in the list of employers, whereby the list of employers compiled with the IDV GUI is spatially displayed by the CRM GUI;
receiving further selections via the CRM GUI to further compile the list of employers of interest;
receiving a selection via the CRM GUI to apply a financial stress filter to the further compiled list of employers, the CRM GUI in response to the selection to apply the financial stress filter referring to an external database for a financial stress score for each employer in the further compiled list and based thereon determining which employers in the further compiled list are in danger of layoffs; and
receiving a selection via the CRM GUI to store each employer in the further compiled list which is in danger of layoffs in a record in the GIS, whereby the employers in the record in the GIS may be the subject of a layoff aversion outreach campaign, and the record of the employers in the GIS may be used to make edits, bring in contacts, schedule tasks, and record comments as the layoff aversion outreach campaign progresses,
the visual representation being a bubble chart, each sector being represented on the bubble chart as a bubble sized according to employment size of the sector within the selected region and being positioned according to importance of the sector within the selected region vs. employment size of the sector within the selected region, the method further comprising receiving a selection via the IDV GUI to play the bubble chart and in response thereto compiling a bubble chart for each of several previous years and then sequentially displaying the compiled bubble charts to show the progression of the sectors over the previous years,
the system including a processor, a memory, an inputting device, and a display, the GIS, IDV GUI, and CRM GUI being instantiated in the memory and manipulated by the processor, the selections being received by the inputting device, and the map and visual representation being shown in the display,
the method further comprising:
defining a location quotient for each sector, the location quotient defining how specialized the sector is in the selected region relative to a super-region which includes the selected region;
positioning the bubble for each sector on the bubble chart according to an importance of the sector of the bubble within the selected region, the importance being defined by the location quotient for the sector; and
displaying in the bubble chart a line representing a baseline location quotient for the super-region with respect to an amount of employment in each sector, the baseline location quotient being 1 such that any sector to one side of the line has a location quotient greater than 1, is more important within the region relative to the super-region, and is more specialized in the region.

2. The method of claim 1 wherein each sector within the visual representation has a prominence therein corresponding to a prominence of the sector within the selected region in terms of one of employment and average salary.

3. The method of claim 1 wherein each sector within the visual representation is positioned in one direction according to relative prominence as compared with other sectors and in an orthogonal direction according to total employment.

4. The method of claim 1 comprising receiving, in an iterative manner, a selection via the IDV GUI of a geographic sub-region of the selected region, the IDV GUI in response to the selection displaying a visual representation of a number of major industry sectors present within the selected sub-region, each sector within the visual representation having a prominence therein corresponding to a prominence of the sector within the selected sub-region.

5. The method of claim 1 comprising receiving, in an iterative manner, a selection via the IDV GUI of a displayed major industry sector of the selected region, the IDV GUI in response to the selection displaying a visual representation of a number of major industry sub-sectors of the selected sector, each sub-sector within the visual representation having a prominence therein corresponding to a prominence of the sub-sector within the selected sub-region.

6. The method of claim 1 further comprising the IDV GUI receiving a selection of a particular employer in the record in the GIS, identifying relevant attributes of the selected employer, and performing a search for all employers sharing the relevant attributes but having a less-severe financial stress score and thus not as likely to engage in layoffs.

7. A system for supporting economic analytics and business outreach, including layoff aversion, the system comprising:
a current and historical business Geographical Information System (GIS) including a database of a region and labor market web-services;
a regional economy visual and spatial analytics interactive data visualization (IDV) Graphical User Interface (GUI); and
a map-based customer relations management (CRM) GUI for local employer outreach map-based CRM,
the IDV GUI:
receiving a selection of a geographic region of interest, the IDV GUI in response to the selection displaying a visual representation of a number of major industry sectors present within the selected region, each sector within the visual representation having a first visual prominence therein corresponding to a first numerical prominence of the sector within the selected region, and a second visual prominence therein corresponding to a second numerical prominence of the sector within the selected region;
receiving further selections of geographic sub-regions and/or industry sub-sectors of the selected region in order to focus onto local employers of interest in the region;
receiving a selection to obtain occupations, job listings, and/or business lists corresponding to a sub-region of interest and/or a sub-sector of interest;
receiving further selections to compile a list of employers of interest;
receiving a selection to transfer the list of employers to the map-based CRM GUI;
the CRM GUI:
upon receiving the list and related information from the IDV GUI, opening and displaying a map focused on the selected region, the map displayed by the CRM GUI including a map layer showing the selected region, and an overlaid point layer with a point representing a geographic location of each employer in the list of employers, whereby the list of employers compiled with the IDV GUI is spatially displayed by the CRM GUI;
receiving further selections to further compile the list of employers of interest;
receiving a selection to apply a financial stress filter to the further compiled list of employers, the CRM GUI in response to the selection to apply the financial stress filter referring to an external database for a financial stress score for each employer in the further compiled list and based thereon determining which employers in the further compiled list are in danger of layoffs; and
receiving a selection via the CRM GUI to store each employer in the further compiled list which is in danger of layoffs in a record in the GIS, whereby the employers in the record in the GIS may be the subject of a layoff aversion outreach campaign, and the record of the employers in the GIS may be used to make edits, bring in contacts, schedule tasks, and record comments as the layoff aversion outreach campaign progresses,
the visual representation being a bubble chart, each sector being represented on the bubble chart as a bubble sized according to employment size of the sector within the selected region and being positioned according to importance of the sector within the selected region vs. employment size of the sector within the selected region, the method further comprising receiving a selection via the IDV GUI to play the bubble chart and in response thereto compiling a bubble chart for each of several previous years and then sequentially displaying the compiled bubble charts to show the progression of the sectors over the previous years,
the system including a processor, a memory, an inputting device, and a display, the GIS, IDV GUI, and CRM GUI being instantiated in the memory and manipulated by the processor, the selections being received by the inputting device, and the map and visual representation being shown in the display,
the IDV GUI further:
defining a location quotient for each sector, the location quotient defining how specialized the sector is in the selected region relative to a super-region which includes the selected region;
positioning the bubble for each sector on the bubble chart according to an importance of the sector of the bubble within the selected region, the importance being defined by the location quotient for the sector; and
displaying in the bubble chart a line representing a baseline location quotient for the super-region with respect to an amount of employment in each sector, the baseline location quotient being 1 such that any sector to one side of the line has a location quotient greater than 1, is more important within the region relative to the super-region, and is more specialized in the region.

8. The system of claim 7 wherein each sector within the visual representation has a prominence therein corresponding to a prominence of the sector within the selected region in terms of one of employment and average salary.

9. The system of claim 7 wherein each sector within the visual representation is positioned in one direction according to relative prominence as compared with other sectors and in an orthogonal direction according to total employment.

10. The system of claim 7 wherein the IDV GUI receives, in an iterative manner, a selection of a geographic sub-region of the selected region, the IDV GUI in response to the selection displaying a visual representation of a number of major industry sectors present within the selected sub-region, each sector within the visual representation having a prominence therein corresponding to a prominence of the sector within the selected sub-region.

11. The system of claim 7 wherein the IDV GUI receives, in an iterative manner, a selection of a displayed major industry sector of the selected region, the IDV GUI in response to the selection displaying a visual representation of a number of major industry sub-sectors of the selected sector, each sub-sector within the visual representation having a prominence therein corresponding to a prominence of the sub-sector within the selected sub-region.

12. The system of claim 7 wherein the IDV GUI receives a selection of a particular employer in the record in the GIS, identifies relevant attributes of the selected employer, and performs a search for all employers sharing the relevant attributes but having a less-severe financial stress score and thus not as likely to engage in layoffs.

* * * * *